US011699366B2

(12) United States Patent
Song et al.

(10) Patent No.: US 11,699,366 B2
(45) Date of Patent: Jul. 11, 2023

(54) DISPLAY DEVICE

(71) Applicant: LG DISPLAY CO., LTD., Seoul (KR)

(72) Inventors: Jihun Song, Paju-si (KR); Hoiyong Kwon, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 22 days.

(21) Appl. No.: 17/410,718

(22) Filed: Aug. 24, 2021

(65) Prior Publication Data

US 2022/0076596 A1 Mar. 10, 2022

(30) Foreign Application Priority Data

Sep. 8, 2020 (KR) .................. 10-2020-0114460

(51) Int. Cl.
*G09F 9/30* (2006.01)
*G06F 1/16* (2006.01)
(52) U.S. Cl.
CPC ............ *G09F 9/301* (2013.01); *G06F 1/1652* (2013.01); *G06F 1/1656* (2013.01)
(58) Field of Classification Search
CPC combination set(s) only.
See application file for complete search history.

(56) References Cited

U.S. PATENT DOCUMENTS

| 11,234,337 B2* | 1/2022 | Song ..................... G06F 1/1652 |
| 11,270,606 B2* | 3/2022 | Kwon ..................... G09F 9/301 |
| 11,363,728 B2* | 6/2022 | Kwon ..................... H05K 5/03 |
| 11,445,622 B2* | 9/2022 | Shin ..................... H05K 5/0217 |
| 11,455,913 B2* | 9/2022 | Kwon ................. H01L 51/5246 |
| 2010/0295761 A1 | 11/2010 | van Lieshout et al. |
| 2015/0274228 A1 | 10/2015 | Kita |
| 2016/0259368 A1 | 9/2016 | Bibl |
| 2017/0367198 A1 | 12/2017 | Park et al. |
| 2019/0138058 A1 | 5/2019 | Kwon et al. |
| 2019/0198783 A1 | 6/2019 | Kim et al. |
| 2020/0060028 A1 | 2/2020 | Kim et al. |
| 2020/0084897 A1 | 3/2020 | Shin et al. |
| 2021/0007230 A1* | 1/2021 | Kang ................... H05K 5/0017 |
| 2021/0343194 A1* | 11/2021 | Suga ...................... H01L 27/32 |

(Continued)

FOREIGN PATENT DOCUMENTS

| CN | 205943344 U | 2/2017 |
| EP | 3261084 A1 | 12/2017 |

(Continued)

OTHER PUBLICATIONS

Extended European Search report dated May 30, 2022, issued in corresponding European Patent Application No. 21194158.8.

(Continued)

*Primary Examiner* — Lisa Lea-Edmonds
(74) *Attorney, Agent, or Firm* — Morgan, Lewis & Bockius LLP

(57) ABSTRACT

A display device may include a display panel in which a plurality of pixels is defined, a back cover disposed on a bottom surface of the display panel, a roller which winds or unwinds the back cover and the display panel and a cover unit which is disposed at a lower side of the display panel and includes a variable cover which moves up or down as the display panel is wound or unwound. Stain, cracks, and separation of the display panel which are caused during the rolling may be reduced.

19 Claims, 32 Drawing Sheets

(56) References Cited

U.S. PATENT DOCUMENTS

2022/0141978 A1* 5/2022 Yoon .................... G06F 1/1652
                                                        361/807
2022/0189347 A1* 6/2022 Oh ...................... H01L 27/3276

FOREIGN PATENT DOCUMENTS

| EP | 3623897 A2 | 3/2020 |
| KR | 10-2015-0068467 A | 6/2015 |
| KR | 10-2017-0019043 A | 2/2017 |
| KR | 10-2018-0073774 A | 7/2018 |
| KR | 10-2020-0031933 A | 3/2020 |
| WO | 2009/070025 A2 | 6/2009 |
| WO | 2020/065988 A1 | 4/2020 |

OTHER PUBLICATIONS

Partial European Search Report dated Feb. 1, 2022, issued in corresponding European Patent Application No. 21194158.8.

\* cited by examiner

DISPLAY DEVICE

CROSS-REFERENCE TO RELATED APPLICATIONS

This application claims the priority of Korean Patent Application No. 10-2020-0114460 filed on Sep. 8, 2020, in the Korean Intellectual Property Office, the disclosure of which is incorporated herein by reference.

BACKGROUND

Technical Field

The present disclosure relates to a display device, and more particularly, to a rollable display device which is capable of displaying images even in a rolled state.

Discussion of the Related Art

As display devices which are used for a monitor of a computer, a television, or a cellular phone, there are an organic light emitting display device (OLED) which is a self-emitting device and a liquid crystal display device (LCD) which requires a separate light source.

An applicable range of the display device is diversified to personal digital assistants as well as monitors of computers and televisions and a display device with a large display area and a reduced volume and weight is being studied.

Further, recently, a rollable display device which is manufactured by forming a display element and a wiring line on a flexible substrate such as plastic which is a flexible material so as to be capable of displaying images even though the display device is rolled is getting attention as a next generation display device.

SUMMARY

Accordingly, embodiments of the present disclosure are directed to a display device that substantially obviates one or more of the problems due to limitations and disadvantages of the related art.

An aspect of the present disclosure is to provide a display device which reduces stain, cracks, and separation of the display panel caused during the rolling.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described herein, a display device includes a display panel in which a plurality of pixels is defined, a back cover disposed on a bottom surface of the display panel, a roller which winds or unwinds the back cover and the display panel and a cover unit which is disposed at a lower side of the display panel and includes a variable cover which moves up and down as the display panel is wound or unwound.

Other detailed matters of the exemplary embodiments are included in the detailed description and the drawings.

According to the present disclosure, a uniform radius of curvature is implemented on the entire section of the roller using a roller shell and a variable cover to reduce stain, cracks, and separation of the display panel caused during the rolling. By doing this, the defect is eliminated to improve a reliability.

It is to be understood that both the foregoing general description and the following detailed description are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain various principles. In the drawings.

DETAILED DESCRIPTION

Figure 1A:
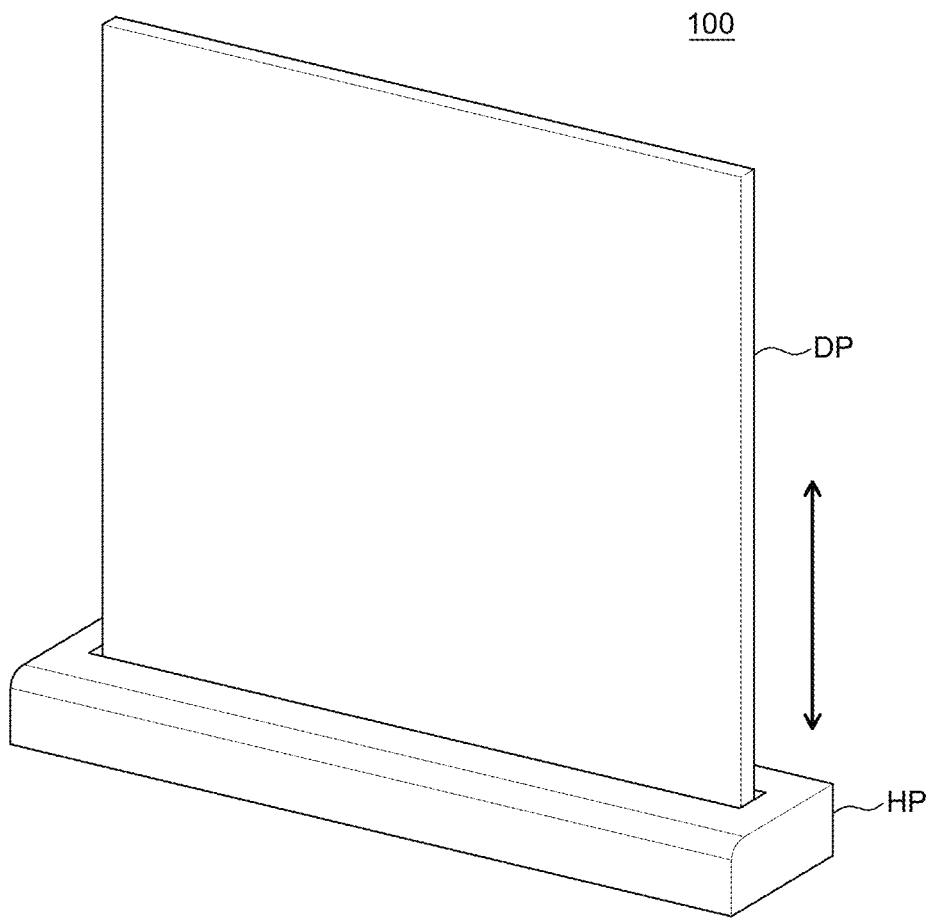
FIGS. 1A and 1B are perspective views of a display device according to an exemplary embodiment of the present disclosure.

Advantages and characteristics of the present disclosure and a method of achieving the advantages and characteristics will be clear by referring to exemplary embodiments described below in detail together with the accompanying drawings. However, the present disclosure is not limited to the exemplary embodiments disclosed herein but will be implemented in various forms. The exemplary embodiments are provided by way of example only so that those skilled in the art can fully understand the disclosures of the present disclosure and the scope of the present disclosure. Therefore, the present disclosure will be defined only by the scope of the appended claims.

The shapes, sizes, ratios, angles, numbers, and the like illustrated in the accompanying drawings for describing the exemplary embodiments of the present disclosure are merely examples, and the present disclosure is not limited thereto. Like reference numerals generally denote like elements throughout the specification. Further, in the following description of the present disclosure, a detailed explanation of known related technologies may be omitted to avoid unnecessarily obscuring the subject matter of the present disclosure. The terms such as "including," "having," and "consist of" used herein are generally intended to allow other components to be added unless the terms are used with the term "only". Any references to singular may include plural unless expressly stated otherwise.

Components are interpreted to include an ordinary error range even if not expressly stated.

When the position relation between two parts is described using the terms such as "on", "above", "below", and "next", one or more parts may be positioned between the two parts unless the terms are used with the term "immediately" or "directly".

When an element or layer is disposed "on" another element or layer, another layer or another element may be interposed directly on the other element or therebetween.

Although the terms "first", "second", and the like are used for describing various components, these components are not confined by these terms. These terms are merely used for distinguishing one component from the other components. Therefore, a first component to be mentioned below may be a second component in a technical concept of the present disclosure.

Like reference numerals generally denote like elements throughout the specification.

A size and a thickness of each component illustrated in the drawing are illustrated for convenience of description, and the present disclosure is not limited to the size and the thickness of the component illustrated.

The features of various embodiments of the present disclosure can be partially or entirely adhered to or combined with each other and can be interlocked and operated in technically various ways, and the embodiments can be carried out independently of or in association with each other.

Hereinafter, exemplary embodiments of the present disclosure will be described in detail with reference to accompanying drawings.

<A Rollable Display Device>

A rollable display device may also be referred to as a display device which is capable of displaying images even though the display device is rolled. The rollable display device may have a high flexibility as compared with a general display device of the related art. Depending on whether to use a rollable display device, a shape of the rollable display device may freely vary. Specifically, when the rollable display device is not used, the rollable display device is rolled to be stored with a reduced volume. In contrast, when the rollable display device is used, the rolled rollable display device is unrolled to be used.

Figure 1B:
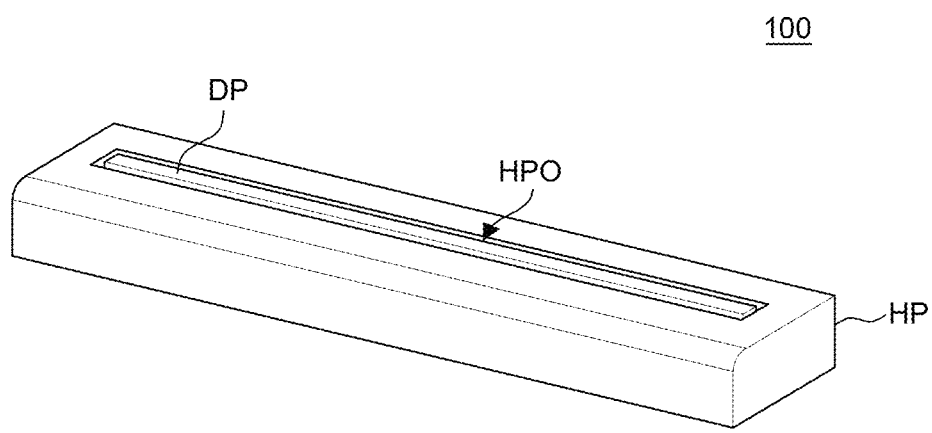

FIGS. 1A and 1B are perspective views of a display device according to an exemplary embodiment of the present disclosure.

Referring to FIGS. 1A and 1B, a display device 100 according to an exemplary embodiment of the present disclosure may include a display unit DP and a housing unit HP.

The display unit DP is a configuration for displaying images to a user and for example, in the display unit DP, a display element and a circuit, a wiring line, a component, and the like for driving the display element may be disposed.

In this case, since the display device 100 according to the exemplary embodiment of the present disclosure is a rollable display device 100, the display unit DP may be configured to be wound and unwound. For example, the display unit DP according to the exemplary embodiment of the present disclosure may be formed of a display panel and a back cover each having flexibility to be wound or unwound. The display unit DP will be described below in more detail with reference to FIGS. 5 to 7B.

The housing unit HP is a case in which the display unit DP is accommodated. The display unit DP may be wound to be accommodated in the housing unit HP and the display unit DP may be unwound to be disposed at the outside of the housing unit HP.

The housing unit HP has an opening HPO to allow the display unit DP to move to the inside and the outside of the housing unit HP. The display unit DP may move in a vertical direction by passing through the opening HPO of the housing unit HP.

The display unit DP of the display device 100 may be switched from a fully unwound state to a fully wound state or from a fully wound state to a fully unwound state.

FIG. 1A illustrates the display unit DP of the display device 100 which is fully unwound as an example and in the fully unwound state, the display unit DP of the display device 100 is disposed at the outside of the housing unit HP. That is, in order for a user to watch images through the display device 100, when the display unit DP is unwound to be disposed at the outside of the housing unit HP as much as possible and cannot be further unwound, it may be defined as a fully unwound state.

FIG. 1B illustrates the display unit DP of the display device 100 which is fully wound as an example and in the fully wound state, the display unit DP of the display device 100 is accommodated in the housing unit HP and cannot be further wound. That is, when the user does not watch the images through the display device 100, it is advantageous from the viewpoint of an external appearance when the display unit DP is not disposed at the outside of the housing unit HP. Therefore, when the display unit DP is wound to be accommodated in the housing unit HP, it is defined as a fully wound state.

When the display unit DP is in a fully wound state to be accommodated in the housing unit HP, a volume of the display device 100 is reduced and the display device 100 may be easily carried.

In order to switch the display unit DP to a fully unwound state or a fully wound state, a driving unit which winds or unwinds the display unit DP may be disposed.

<Driving Unit>

Figure 2:
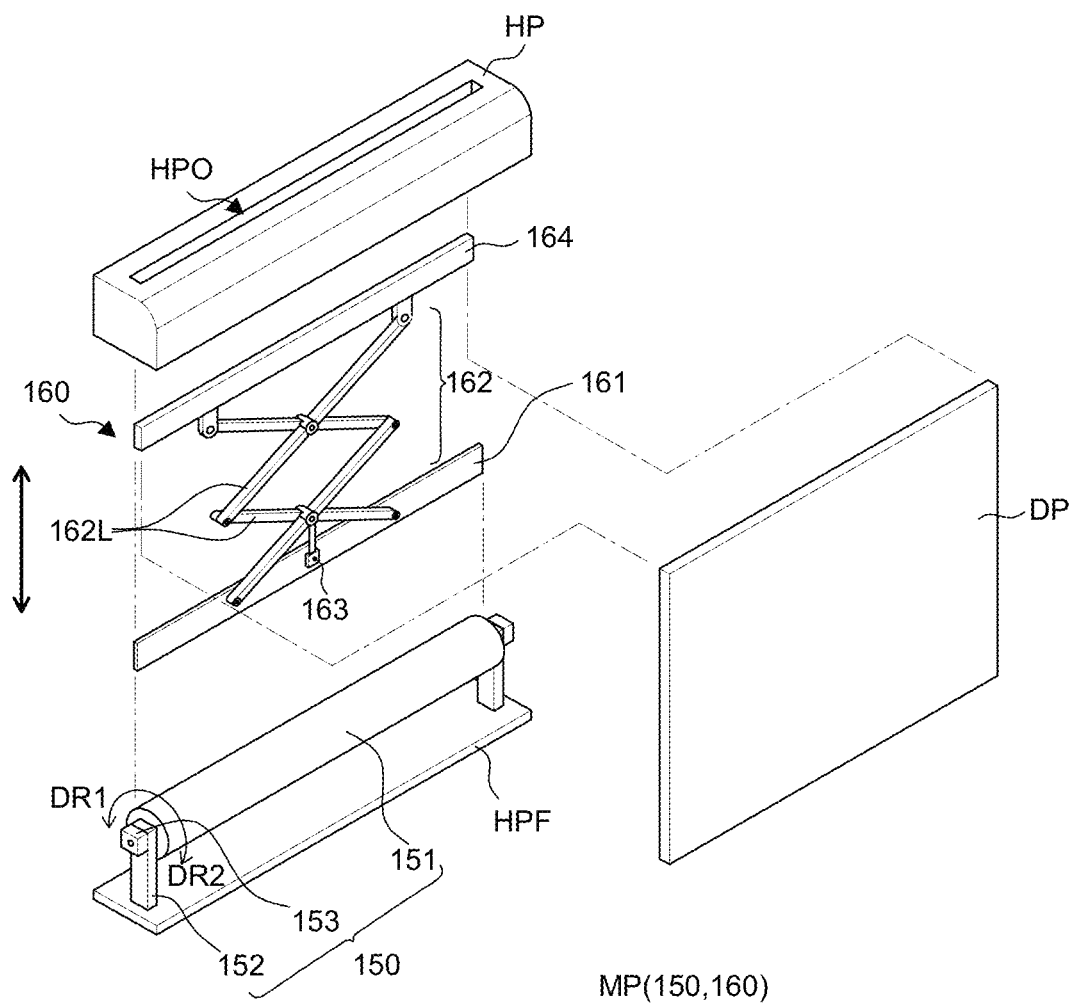
FIG. 2 is an exploded perspective view of a display device according to an exemplary embodiment of the present disclosure.

FIG. 2 is an exploded perspective view of a display device according to an exemplary embodiment of the present disclosure.

Figure 3:
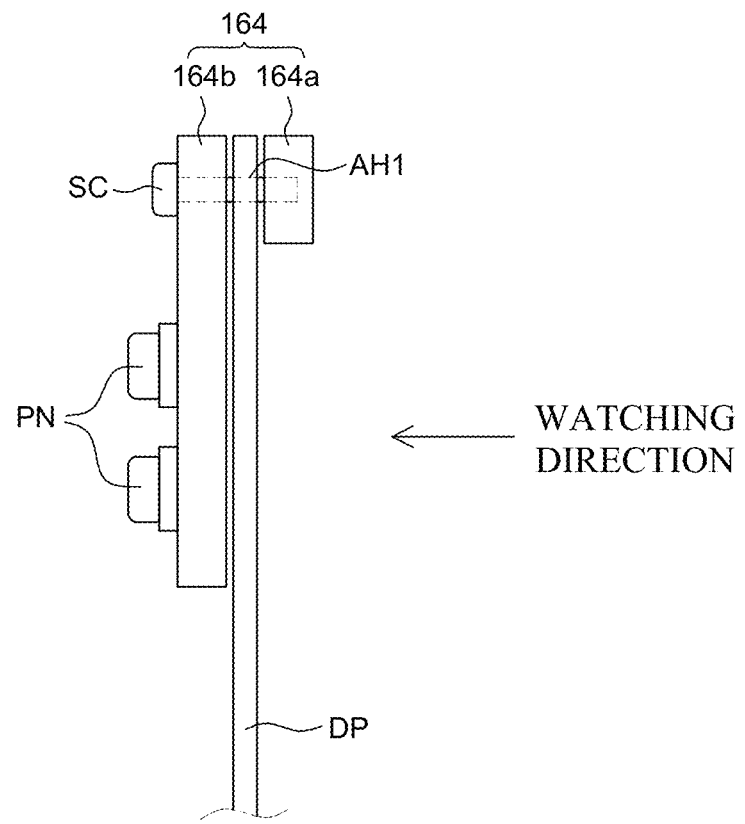
FIG. 3 is a partial cross-sectional view of a head bar and a display unit of a display device according to an exemplary embodiment of the present disclosure.
Figure 4:
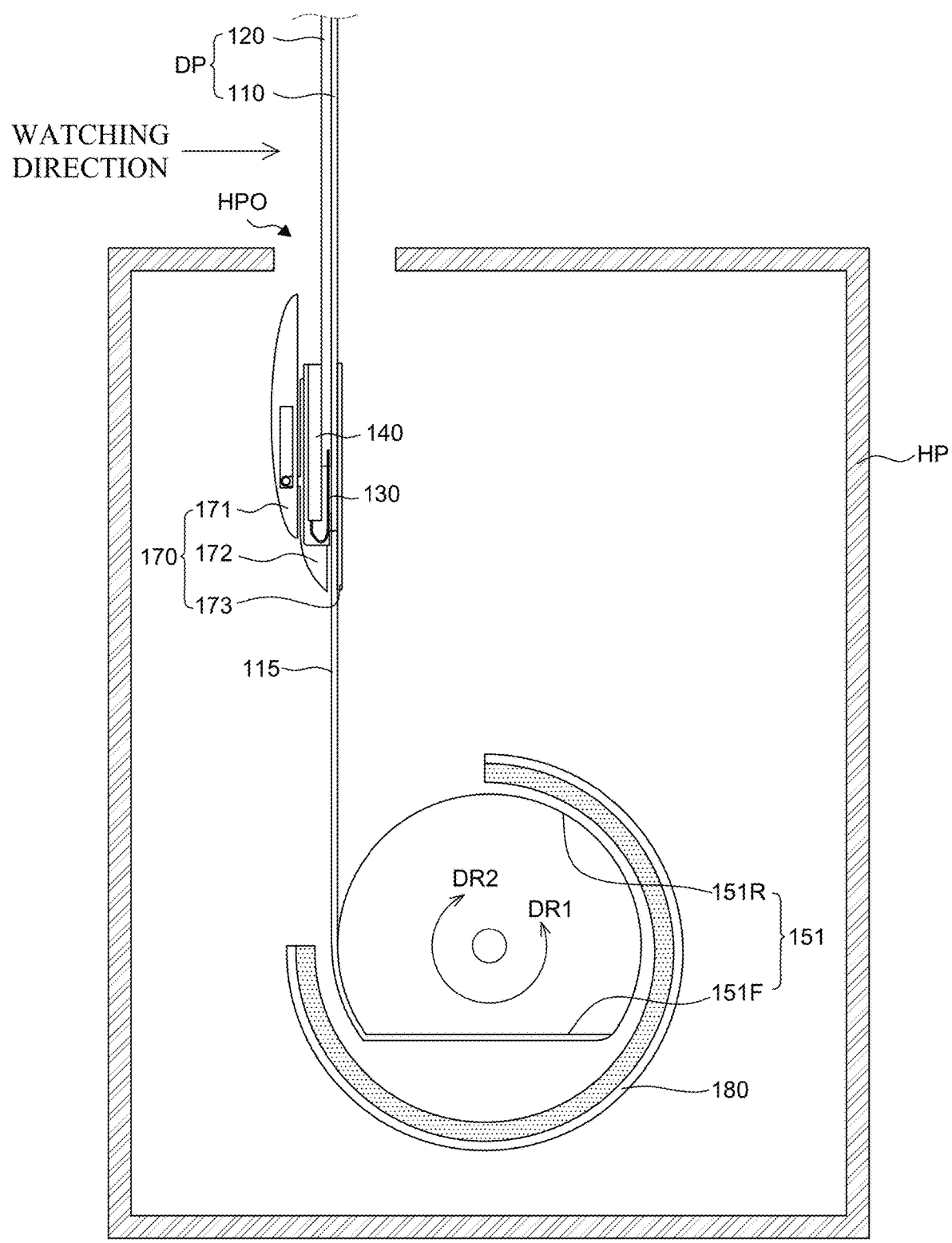
FIG. 4 is a cross-sectional view of a display device according to an exemplary embodiment of the present disclosure.

FIG. 3 is a partial cross-sectional view of a head bar and a display unit of a display device according to an exemplary embodiment of the present disclosure;

FIG. 4 is a cross-sectional view of a display device according to an exemplary embodiment of the present disclosure.

FIG. 4 is a schematic cross-sectional view for explaining a cover unit 170, a roller 151, a roller shell 180, and a display unit DP of a display device 100 according to an exemplary embodiment of the present disclosure. However, the present disclosure is not limited to the structure illustrated in FIG. 4.

Further, for the convenience of description, FIG. 3 illustrates only a head bar 164 and a display unit DP and FIG. 4 illustrates only a housing unit HP, a cover unit 170, a roller 151, a roller shell 180, and a display unit DP.

Referring to FIG. 2, a driving unit MP may include a roller unit 150 and a lifting unit 160.

A roller unit 150 may rotate in a first direction DR1 or a second direction DR2 and wind or unwind the display unit DP fixed to the roller unit 150.

The roller unit 150 may include a roller 151, a roller support unit 152, and a roller rotating unit 153.

The roller 151 is a member around which the display unit DP is wound. The roller 151 may be, for example, formed to have a cylindrical shape. A lower edge of the display unit DP may be fixed to the roller 151. When the roller 151 rotates, the display unit DP which is fixed to the roller 151 through the lower edge may be wound around the roller 151. In contrast, when the roller 151 rotates in an opposite direction, the display unit DP which is wound around the roller 151 may be unwound from the roller 151. The roller 151 may be formed of a metal material or a plastic material having a rigidity.

The roller 151 may have a curved portion 151R with a surface having a constant radius of curvature and a flat portion 151F with a flat surface.

The roller support unit 152 may support the roller 151 at both ends of the roller 151. Specifically, the roller support unit 152 is disposed on a bottom surface HPF of the housing unit HP. Upper side surfaces of the roller support unit 152 are coupled to both ends of the roller 151. By doing this, the roller support unit 152 may support the roller 151 to be spaced apart from the bottom surface HPF of the housing unit HP. The roller 151 may be rotatably coupled to the roller support unit 152.

The roller rotating units 153 may rotate the roller 151 in the first direction DR1 or the second direction DR2. Roller rotating units 153 may be disposed in a pair of roller support units 152. For example, the roller rotating units 153 may be rotary motors which transmit a torque to the roller 151, but are not limited thereto.

The lifting unit 160 moves the display unit DP in a vertical direction in accordance with the driving of the roller unit 150. The lifting unit 160 may include a link support unit 161, a link unit 162, a link lifting unit 163, and a head bar 164.

The link support unit 161 may support the link unit 162 and the link lifting unit 163.

Specifically, the link support unit 161 may support the link unit 162 and the display unit DP which move in the vertical direction so as not to collide with a boundary of the opening HPO of the housing unit HP. The link support unit 161 may support the link unit 162 and the display unit DP to move only in a vertical direction without moving in a forward and backward direction.

The link unit 162 may include a plurality of links 162L which is hinged with each other. The plurality of links 162L is rotatably hinged to each other to move in the vertical direction by the link lifting unit 163. When the link unit 162 moves in the vertical direction, the plurality of links 162L may rotate to be far away from each other or close to each other. A detailed description thereof will be made below with reference to FIG. 4.

The link lifting unit 163 may move the link unit 162 in the vertical direction. The link lifting unit 163 may rotate the plurality of links 162L of the link unit 162 to be close to each other or rotate the plurality of links 162L to be far away from each other. The link lifting unit 163 may lift or lower the link unit 162 to lift or lower the display unit DP connected to the link unit 162.

The link lifting unit 163 may be driven to be synchronized with the roller rotating unit 153 so that the roller unit 150 and the lifting unit 160 may simultaneously operate. For example, when the display unit DP is switched from a fully unwound state to a fully wound state, the roller unit 150 may operate to wind the display unit DP around the roller 151 and simultaneously with this, the lifting unit 160 may operate to rotate the plurality of links 162L of the link unit 162 to lower the display unit DP. Further, when the display unit DP is switched from a fully wound state to a fully unwound state, the roller unit 150 may operate to unwind the display unit DP from the roller 151 and simultaneously with this, the lifting unit 160 may operate to rotate the plurality of links 162L of the link unit 162 to lift the display unit DP.

The head bar 164 of the lifting unit 160 may be fixed to an uppermost end of the display unit DP. The head bar 164 is coupled to the link unit 162 to move the display unit DP in the vertical direction in accordance with the rotation of the plurality of links 162L of the link unit 162. That is, the display unit DP may be moved in a vertical direction by the head bar 164, the link unit 162, and the link lifting unit 163.

Referring to FIGS. 2 and 3 together, the head bar 164 is disposed at the uppermost end of the display unit DP so as to enclose a top surface and a bottom surface of the display unit DP. It should be noted that the top surface and the bottom surface of the display unit DP may be referred to as the front surface and the rear surface when the display unit DP is in a vertical state.

The head bar 164 may include a first head bar 164a and a second head bar 164b. The first head bar 164a may cover a top surface of the display unit DP. The first head bar 164a may cover only a part of the top surface which is adjacent to an uppermost edge of the display unit DP so as not to hide an image displayed on the top surface of the display unit DP.

The second head bar 164a may cover a bottom surface of the display unit DP. The second head bar 164a may cover a part of the bottom surface of the display unit DP adjacent to the uppermost edge of the display unit DP. However, since no image is displayed on the bottom surface of the display unit DP, the second head bar 164*b* may overlap the display unit DP more than the first head bar 164*a*.

In order to fasten the display unit DP with the first head bar 164*a* and the second head bar 164*b*, a first fastening hole AH1 may be formed in the display unit DP. A screw SC passes through the first fastening hole AH1 to fasten the first head bar 164*a*, the display unit DP, and the second head bar 164*b*.

Pem nuts PN to which the link unit 162 of the lifting unit 160 is fasten are disposed in the second head bar 164*b*. The second head bar 164*b* and the link unit 162 of the lifting unit 160 may be fastened with each other by the pem nuts PN. Therefore, when the link unit 162 of the lifting unit 160 moves in the vertical direction, the second head bar 164*b* fastened with the link unit 162 and the first head bar 164*a* and the display unit DP fastened with the second head bar 164*b* may move together in the vertical direction.

Even though in FIG. 3, it is illustrated that the first head bar 164*a* and the second head bar 164*b* have a linear shape, the shapes of the first head bar 164*a* and the second head bar 164*b* may be changed in various forms and are not limited thereto.

Hereinafter, a driving operation of the driving unit MP will be described in detail with reference to FIG. 4 together.

Referring to FIGS. 2 to 4, when the display unit DP is in a vertical state, the cover unit 170 is disposed at a lowermost edge of the display unit DP and an upper edge of the extending sheet 115 may be fastened with the cover unit 170, simultaneously. Further, the extending sheet 115 extends downwardly so that the lowermost edge of the extending sheet 115 may be fastened with the roller 151. In the meantime, the extending sheet 115 is not limited to the name of "sheet", but may also be referred to as various names such as a plate or a layer. The extending sheet 115 may be formed of plastic such as polyethylene terephthalate (PET), polypropylene (PP), or polycarbonate (PC), but is not limited thereto. The extending sheet 115 may be formed of the same material as the back cover 110.

The cover unit 170 according to the exemplary embodiment of the present disclosure may include a variable cover 171, a top cover 172, and a base plate 173, but is not limited thereto.

The flexible film 130 is disposed at one end of the non-display area of the display panel 120 and the printed circuit board 140 is disposed on a top surface of the display panel 120 to be connected to the flexible film 130.

The top cover 172 of the cover unit 170 is disposed in the second support area of the back cover 110 to accommodate the printed circuit board 140. The printed circuit board 140 and a part of the back cover 110 and a part of the extending sheet 115 corresponding to the printed circuit board 140 may be inserted into the cover unit 170. The cover unit 170 is disposed to cover the printed circuit board 140 to protect the printed circuit board 140.

In the meantime, according to the present disclosure, the variable cover 171 moves down at the time of unwinding to ensure the display area of the display unit DP and moves up at the time of winding to fill an empty space of the cover unit 170 to implement a uniform radius of curvature over the entire section of the roller 151. The cover unit 170 will be described below in more detail with reference to FIGS. 8A, 8B, 8C, 9A, and 9B.

A roller shell 180 is disposed at the outside of the roller 151 so that the extending sheet 115 and the display unit DP are wound by the roller shell 180 to be in close contact with an outer circumferential surface of the roller 151.

That is, for example, when the roller 151 rotates in a first direction DR1, that is, a counterclockwise direction, by the roller rotating unit 153, the display unit DP may be wound around the roller 151 so that a bottom surface of the display unit DP is in close contact with a surface of the roller 151.

In contrast, when the roller 151 rotates in a second direction DR2, that is, a clockwise direction, by the roller rotating unit 153, the display unit DP wound around the roller 151 is unwound from the roller 151 to be exposed to the outside of the housing unit HP.

In some exemplary embodiments, a driving unit MP having a different structure other than the above-described driving unit MP may also be applied to the display device 100. That is, as long as the display unit DP is wound and unwound, the above-described configuration of the roller unit 150 and the lifting unit 160 may be modified, some configuration may be omitted, or another configuration may be added.

<Display Unit>

Figure 5:
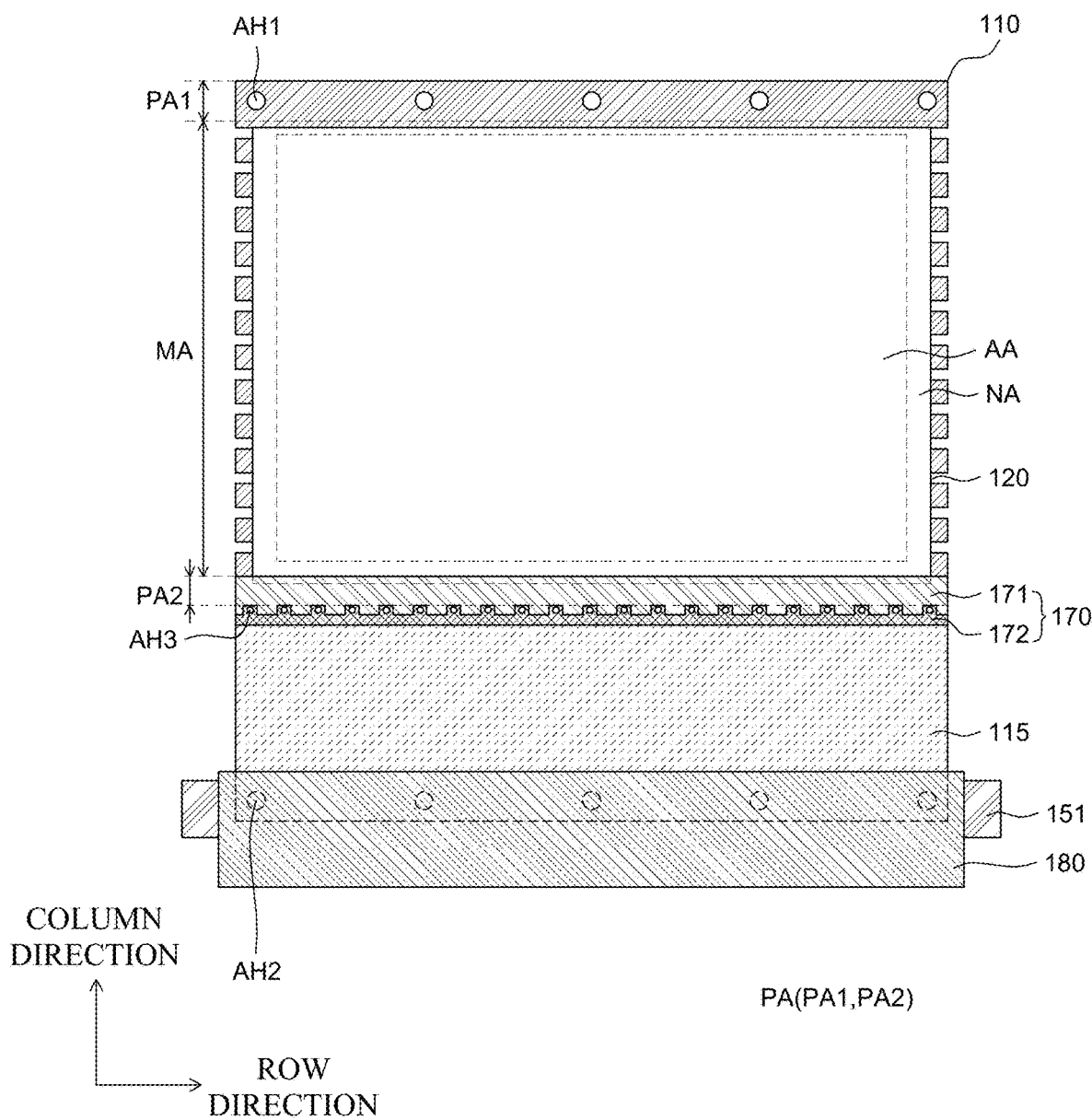
FIG. 5 is a plan view of a display device according to an exemplary embodiment of the present disclosure.

FIG. 5 is a plan view of a display device according to an exemplary embodiment of the present disclosure.

In FIG. 5, a lifting unit is not illustrated for the convenience of the description.

Referring to FIG. 5, the display unit DP may include a back cover 110, a display panel 120, a flexible film 130, and a printed circuit board 140.

At this time, the cover unit 170 may be disposed so as to cover the flexible film 130 and the printed circuit board 140.

The display panel 120 is a panel for displaying images to a user.

The display panel 120 may include a display element which displays images, a driving element which drives the display element, and wiring lines which transmit various signals to the display element and the driving element. The display element may be defined in different ways depending on a type of the display panel 120. For example, when the display panel 120 is an organic light emitting display panel, the display element may be an organic light emitting diode which includes an anode, an organic light emitting layer, and a cathode. For example, when the display panel 120 is a liquid crystal display panel, the display element may be a liquid crystal display element. Hereinafter, even though the display panel 120 is assumed as an organic light emitting display panel, the display panel 120 is not limited to the organic light emitting display panel. Further, since the display device 100 according to the exemplary embodiment of the present disclosure is a rollable display device, the display panel 120 may be implemented as a flexible display panel to be wound around or unwound from the roller 151.

The display panel 120 may include a display area AA and a non-display area NA.

The display area AA is an area where images are displayed in the display panel 120.

In the display area AA, a plurality of sub pixels which configures the plurality of pixels and a circuit for driving the plurality of sub pixels may be disposed. The plurality of sub pixels is minimum units which configure the display area AA and a display element may be disposed in each of the plurality of sub pixels. The plurality of sub pixels may configure a pixel. For example, an organic light emitting diode which includes an anode, an organic light emitting layer, and a cathode may be disposed in each of the plurality of sub pixels, but it is not limited thereto. Further, a circuit for driving the plurality of sub pixels may include a driving element, a wiring line, and the like. For example, the circuit may be configured by a thin film transistor, a storage capacitor, a gate line, a data line, and the like, but is not limited thereto.

The non-display area NA is an area where no image is displayed.

In the non-display area NA, various wiring lines, circuits, and the like for driving the organic light emitting diode of the display area AA are disposed. For example, in the non-display area NA, a link line which transmits signals to the plurality of sub pixels and circuits of the display area AA, a driving IC such as a gate driver IC or a data driver IC, or the like may be disposed, but it is not limited thereto.

The flexible film 130 is a film in which various components are disposed on a base film having a malleability. Specifically, the flexible film 130 is a film which supplies a signal to the plurality of sub pixels and the circuits of the display area AA and is electrically connected to the display panel 120. The flexible film 130 is disposed at one end of the non-display area NA of the display panel 120 to supply a power voltage, a data voltage, or the like to the plurality of sub pixels and the circuits of the display area AA. The number of flexible films 130 may vary depending on the design, and is not limited thereto.

In the meantime, for example, a driving IC such as a gate driver IC or a data driver IC may be disposed on the flexible film 130. The driving IC is a component which processes data for displaying images and receives a driving signal for processing the data. The driving IC may be disposed by a chip on glass (COG), a chip on film (COF), a tape carrier package (TCP), or the like depending on a mounting method.

The printed circuit board 140 is disposed at one end of the flexible film 130 to be connected to the flexible film 130. The printed circuit board 140 is a component which supplies signals to the driving IC. The printed circuit board 140 may supply various signals such as a driving signal or a data signal to the driving IC. For example, a data driver which generates data signals may be mounted in the printed circuit board 140 and the generated data signal may be supplied to the plurality of sub pixels and the circuit of the display panel 120 through the flexible film 130. The number of printed circuit boards 140 may vary depending on the design, and is not limited thereto.

The back cover 110 is disposed on bottom surfaces of the display panel 120, the flexible film 130, and the printed circuit board 140 to support the display panel 120, the flexible film 130, and the printed circuit board 140. Therefore, a size of the back cover 110 may be larger than a size of the display panel 120. Therefore, the back cover 110 may protect other configurations of the display unit DP from the outside. Even though the back cover 110 is formed of a material having a rigidity, at least a part of the back cover 110 may have a flexibility to be wound or unwound together with the display panel 120. For example, the back cover 110 may be formed of a metal material such as steel use stainless SUS or invar or plastic. However, as long as a material of the back cover 110 satisfies physical conditions such as a thermal strain amount, a radius of curvature, and a rigidity, various materials may be used, and is not limited thereto.

The back cover 110 may include a plurality of support areas PA and at least one malleable area MA. The plurality of support areas PA is areas where a plurality of openings 111 is not disposed and the malleable area MA is an area where a plurality of openings 111 is disposed. For example, a first support area PA1, the malleable area MA, and a second support area PA2 are sequentially disposed from the uppermost end of the back cover 110, but is not limited thereto.

A first fastening hole AH1 may be formed in the first support area PA1 and the head bar 164 and the back cover 110 may be fastened by means of the first fastening hole AH1.

The malleable area MA is an area extending from the first support area PA1 towards a lower side of the back cover 110. The malleable area MA is an area in which a plurality of openings 111 is disposed and the display panel 120 is attached.

The second support area PA2 is an area extending from the malleable area MA to the lower side of the back cover 110. The second support area PA2 is an area to which the cover unit 170 is attached. Further, a flexible film 130 which is connected to one end of the display panel 120 and a printed circuit board 140 are attached to the second support area PA2.

The cover unit 170 is disposed at a lowermost edge of the display unit DP and an upper edge of the extending sheet 115 may be fastened with the cover unit 170. A third fastening hole AH3 may be formed in the top cover 172 and an upper edge of the extending sheet 115 and the top cover 172 and the extending sheet 115 may be fastened by means of the third fastening hole AH3.

The extending sheet 115 extends downwardly so that the lowermost edge thereof may be fastened with the roller 151. A second fastening hole AH2 may be formed at a lower edge of the extending sheet 115 and the roller 151 and the extending sheet 115 may be fastened by means of the second fastening hole AH2.

A roller shell 180 is disposed at the outside of the roller 151 so that the extending sheet 115 and the display unit DP are wound by the roller shell 180 to be in close contact with an outer peripheral surface of the roller 151.

Hereinafter, the back cover 110 will be described in more detail with reference to FIGS. 6A and 6B.

<Specific Configuration of Back Cover>

Figure 6A:
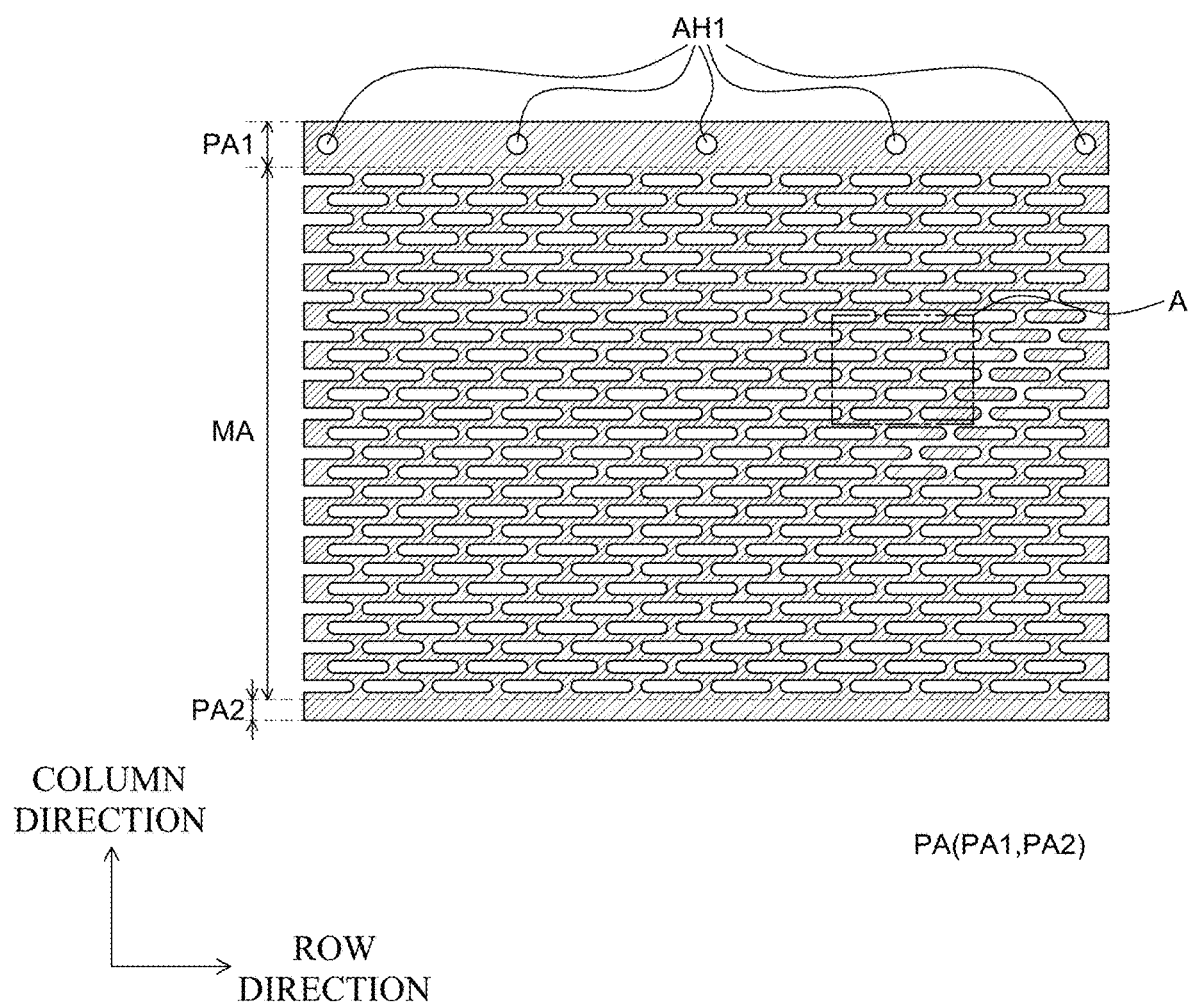
FIG. 6A is a plan view of a back cover of a display device according to an exemplary embodiment of the present disclosure.
Figure 6B:
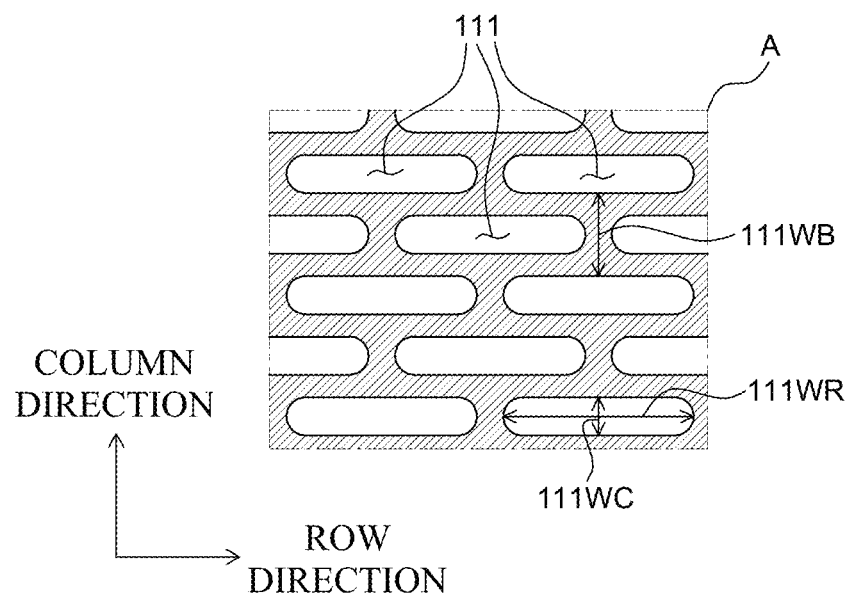
FIG. 6B is an enlarged view of a region A of FIG. 6A.

FIG. 6A is a plan view of a back cover of a display device according to an exemplary embodiment of the present disclosure;

FIG. 6B is an enlarged view of a region A of FIG. 6A.

Referring to FIG. 6A, the back cover 110 may include a plurality of support areas PA and at least one malleable area MA. The plurality of support areas PA is areas where a plurality of openings 111 is not disposed and the malleable area MA is an area where a plurality of openings 111 is disposed. Specifically, a first support area PA1, the malleable area MA, and a second support area PA2 are sequentially disposed from the uppermost end of the back cover 110, but is not limited thereto.

The first support area PA1 of the back cover 110 is an uppermost area of the back cover 110 and is fastened with the head bar 164. The first support area PA1 may include first fastening holes AH1 to be fastened with the head bar 164. As described in detail with reference to FIG. 3, screws SC which pass through the head bar 164 and the first fastening holes AH1 are disposed to fasten the head bar 164 with the first support area PA1 of the back cover 110. As the first support area PA1 is fastened with the head bar 164, when the link unit 162 which is fastened with the head bar 164 is lifted or lowered, the back cover 110 may also be lifted and lowered together with the display panel 120 which is attached to the back cover 110.

Even though five first fastening holes AH1 are illustrated in FIG. 6A, the number of first fastening holes AH1 is not limited thereto.

The malleable area MA is an area extending from the first support area PA1 towards a lower side of the back cover 110. The malleable area MA is an area in which a plurality of openings 111 is disposed and the display panel 120 is attached.

When the display unit DP is wound around the roller 151 to be accommodated in the housing unit HP, the malleable area MA of the back cover 110 and the display panel 120 which is attached to the malleable area MA may be wound around the roller 151. In this case, in the malleable area MA of the back cover 110, the plurality of openings 111 is formed so that the malleable area MA may have a high flexibility and may be easily wound around the roller 151 together with the display panel 120.

The second support area PA2 is an area extending from the malleable area MA to the lower side of the back cover 110. A flexible film 130 which is connected to one end of the display panel 120 and a printed circuit board 140 are attached to the second support area PA2. Further, the cover unit 170 may be attached to the second support area PA2 to cover the flexible film 130 and the printed circuit board 140.

In order to protect the flexible film 130 and the printed circuit board 140, the second support area PA2 may support the flexible film 130 and the printed circuit board 140 to be wound around the roller 151 with a flat shape, rather than a curved shape. Further, a part of the roller 151 may be formed to be flat, corresponding to the second support area PA2.

Referring to FIG. 5 together, the extending sheet 115 may be disposed at a lower side of the back cover 110 so as to dispose the display area AA of the display panel 120 at the outside of the housing unit HP.

For example, when the back cover 110 and the display panel 120 are fully unwound, an area from a lower side of the extending sheet 115 which is fixed to the roller 151 to an upper side of the extending sheet 115 which is fastened with the cover unit 170 may be disposed in the housing unit HP. The malleable area MA and the first support area PA1 to which the display panel 120 is attached may be disposed at the outside of the housing unit HP. The extending sheet 115 is fixed to the roller 151 by means of the second fastening hole AH2 and the extending sheet 115 may be fastened with the cover unit 170 by means of a third fastening hole AH3.

That is, the lowermost end of the extending sheet 115 is fastened with the roller 151. The second fastening holes AH2 may be formed at the lowermost end of the extending sheet 115 to be fastened with the roller 151. For example, screws which pass through the roller 151 and the second fastening hole AH2 are disposed so that the roller 151 and the extending sheet 115 may be fastened with each other.

As the extending sheet 115 is fastened with the roller 151, the extending sheet 115 may be wound around or unwound from the roller 151 by the rotation of the roller 151.

Even though 5 second fastening holes AH2 are illustrated in FIG. 2, the number of second fastening holes AH2 is not limited thereto.

The malleable area MA of the back cover 110 is an area which is wound around or unwound from the roller 151 together with the display panel 120. The malleable area MA may overlap at least the display panel 120 among other configurations of the display unit DP.

Referring to FIGS. 6A and 6B, the plurality of openings 111 is disposed to be staggered from a plurality of openings 111 in adjacent rows. For example, a plurality of openings 111 disposed in one row is disposed to be staggered from a plurality of openings 111 disposed in a row adjacent to the one row. Specifically, centers of the plurality of openings 111 disposed in an odd-numbered row and centers of the plurality of openings 111 disposed in an even-numbered row are disposed to be staggered and for example, may be staggered by a half of a width 111WR in a row direction of the openings 111. The opening 111 may have a width 111WC in a column direction. However, the placement of the plurality of openings 111 illustrated in FIG. 6A is just an example, and is not limited thereto.

As the plurality of openings 111 is disposed to be staggered, a distance 111WB between a plurality of openings 111 with centers matching in a column direction may be minimized. Specifically, an area between the plurality of openings 111 with centers matching in a column direction in the malleable area MA may have a rigidity. When the back cover 110 is wound, the back cover 110 needs to be bent around the roller 151 so that as the distance 111WB of some area between the plurality of openings 111 with centers matching in the column direction becomes longer, it may be difficult for the back cover 110 to be bent around the roller 151. In this case, since the plurality of openings 111 is disposed to be staggered in the unit of row, as compared with the case that the openings are not staggered in the unit of row, the distance 111WB between the plurality of openings 111 with centers matching in the column direction may be minimized and the area between the plurality of openings 111 may also be minimized. Accordingly, the distance 111WB between the plurality of openings 111 with centers matching in the column direction is reduced and continuously extends in the column direction in the malleable area MA so that an area where the plurality of openings 111 is not disposed is removed. Therefore, the distance 111WB of the area between the plurality of openings 111 having a rigidity in the column direction is minimized so that the rigidity of the back cover 110 may be improved without interrupting the winding or unwinding of the back cover 110.

In the first support area PA1 and the second support area PA2, the plurality of openings 111 as formed in the malleable area MA is not formed. That is, in the first support area PA1, only the first fastening holes AH1 is formed, but the plurality of opening 111 as formed in the malleable area MA is not formed.

Further, the first fastening holes AH1, the second fastening holes AH2, and the third fastening holes AH3 have different shapes from that of the plurality of openings 111.

The first support area PA1 of the back cover 110 and the lowermost end of the extending sheet 115 are fixed to the head bar 164 and the roller 151, respectively, so that the first support area PA1 and the lowermost end of the extending sheet need to be more rigid than the malleable area MA. As the first support area PA1 and the lowermost end of the extending sheet 115 have rigidity, the first support area PA1 and the lowermost end of the extending sheet 115 may be firmly fixed to the head bar 164 and the roller 151. Therefore, the display unit DP is fixed to the roller 151 and the head bar 164 of the driving unit MP to be moved to the inside or the outside of the housing unit HP in accordance with the operation of the driving unit MP.

Hereinafter, the cover unit 170 will be described in more detail with reference to FIGS. 7A, 7B, 7C, 8A, and 8B.

<Configuration of Cover Unit in Top Folding Structure>

Figure 7A:
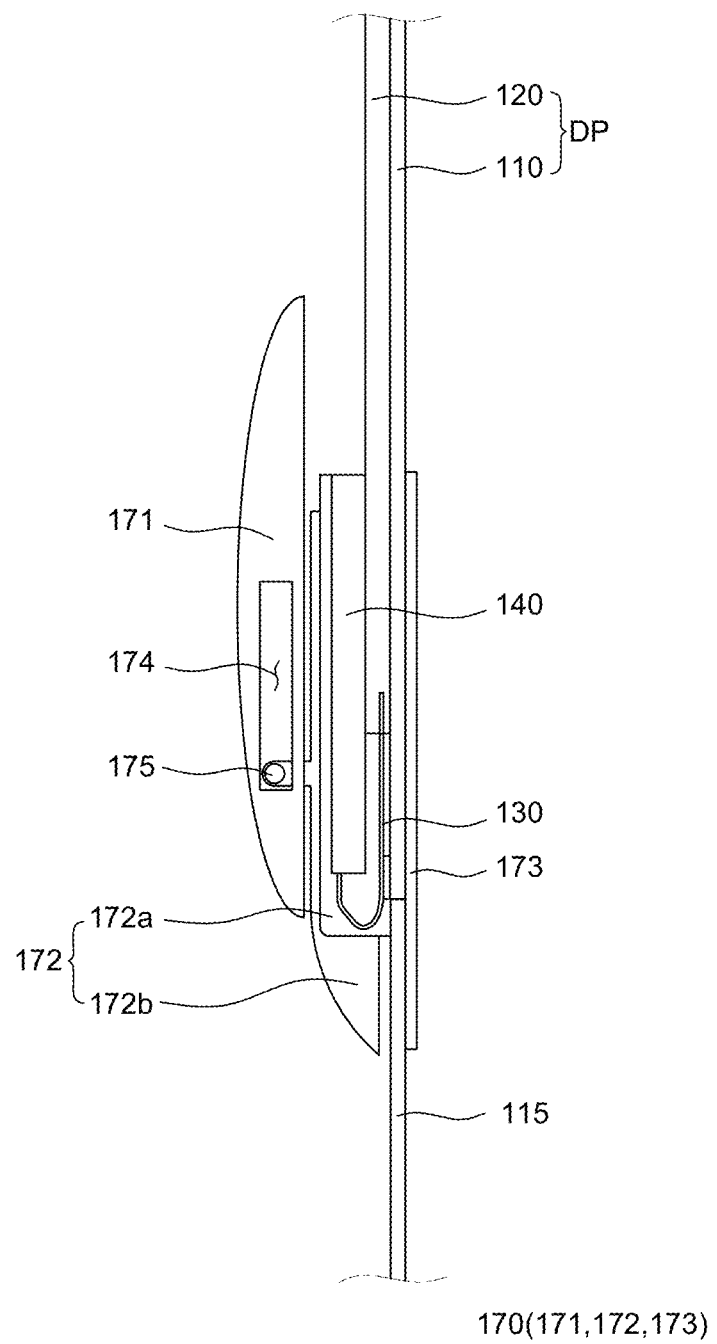
FIG. 7A is a cross-sectional view of a cover unit according to an exemplary embodiment of the present disclosure.

FIG. 7A is a cross-sectional view of a cover unit according to an exemplary embodiment of the present disclosure.

Figure 7B:
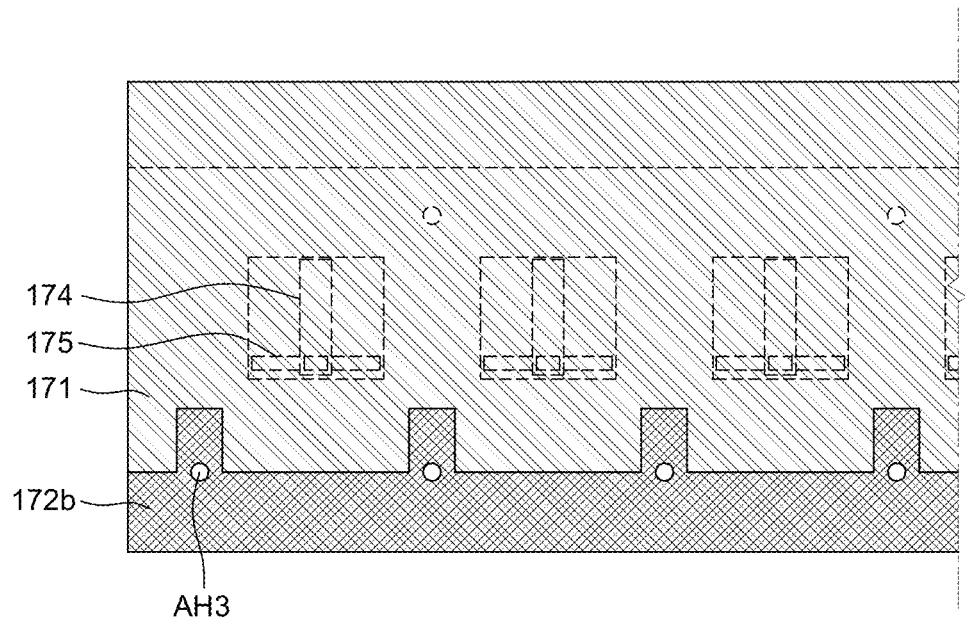
FIG. 7B is a partial plan view of a cover unit according to an exemplary embodiment of the present disclosure.

FIG. 7B is a partial plan view of a cover unit according to an exemplary embodiment of the present disclosure.

Figure 7C:
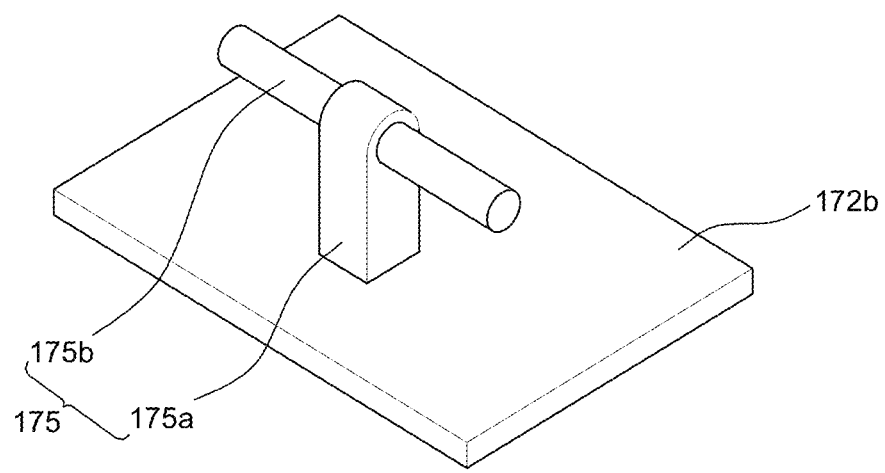
FIG. 7C is a perspective view of a guide unit of FIG. 7B.
Figure 8A:
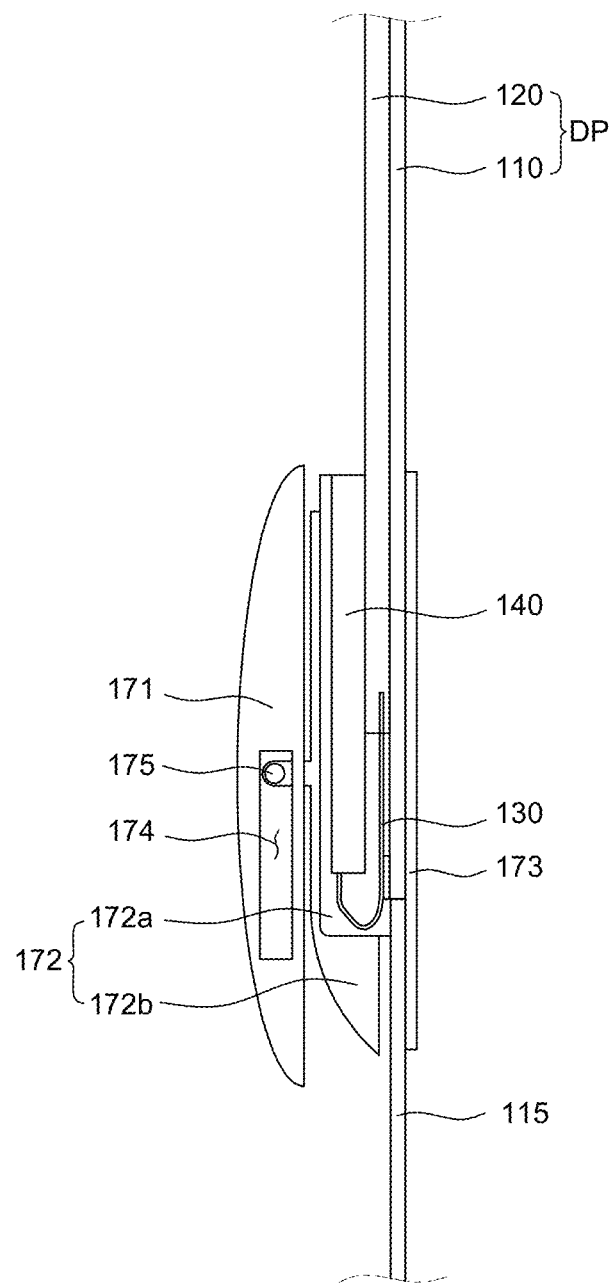
FIG. 8A is a cross-sectional view of a cover unit according to an exemplary embodiment of the present disclosure.

FIG. 7C is a perspective view of a guide unit of FIG. 7B;

FIG. 8A is a cross-sectional view of a cover unit according to an exemplary embodiment of the present disclosure.

Figure 8B:
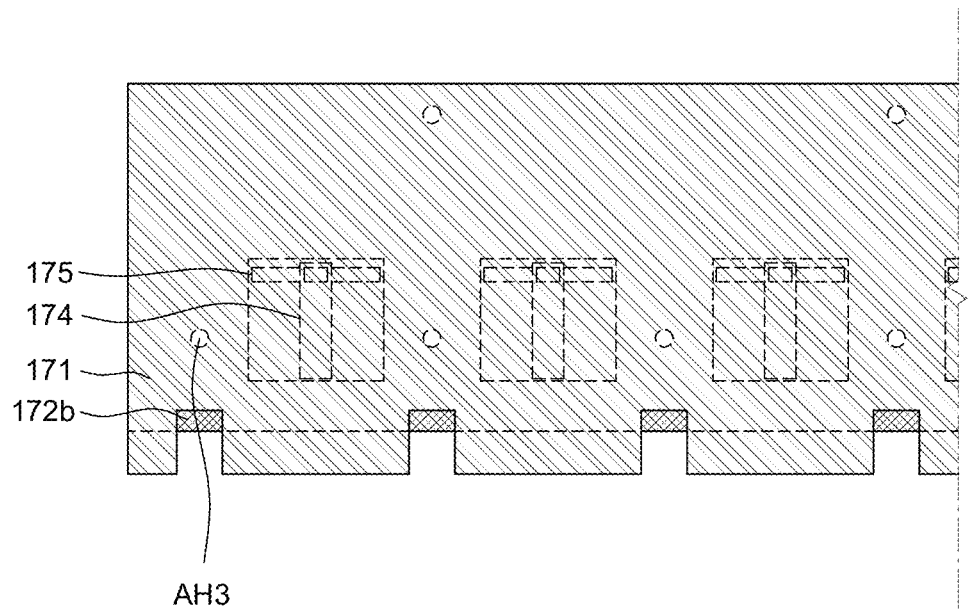
FIG. 8B is a partial plan view of a cover unit according to an exemplary embodiment of the present disclosure.

FIG. 8B is a partial plan view of a cover unit according to an exemplary embodiment of the present disclosure.

FIGS. 7A and 8A illustrate cross-sections of the cover unit 170 and parts of the display unit DP and the extending sheet 115.

FIGS. 7B and 8B are plan views of the cover unit 170 as seen from a front surface.

FIGS. 7A and 7B are a cross-sectional view and a plan view illustrating a state that a variable cover 171 is in contact with a roller shell 180 to move up when the display unit DP is wound.

In contrast, FIGS. 8A and 8B are a cross-sectional view and a plan view illustrating a state that the variable cover 171 moves down by the gravity when the display unit DP is unwound.

Referring to FIGS. 7A, 7B, 7C, 8A, and 8B, the display unit DP may include a back cover 110, a display panel 120, a flexible film 130, and a printed circuit board 140.

As described above, the back cover 110 is disposed on a bottom surface of the display panel 120 to support the display panel 120, the plurality of flexible films 130, and the printed circuit board 140. A size of the back cover 110 may be larger than a size of the display panel 120. The back cover 110 may protect other configurations of the display unit DP from the outside.

The display panel 120 is a panel for displaying images to a user. The display panel 120 may include a display element which displays images, a driving element which drives the display element, wiring lines which transmit various signals to the display element and the driving element, and the like.

The flexible film 130 is disposed at one end of the non-display area NA of the display panel 120 and the printed circuit board 140 is disposed on a top surface of the display panel 120 (top folding) to be connected to the flexible film 130.

At this time, the cover unit 170 is disposed below the display unit DP so as to cover the flexible film 130 and the printed circuit board 140.

That is, the cover unit 170 is disposed at a lowermost edge of the display unit DP and an upper edge of the extending sheet 115 may be fastened with the cover unit 170. Further, the extending sheet 115 extends downwardly so that the lowermost edge thereof may be fastened with the roller 151.

The cover unit 170 according to the exemplary embodiment of the present disclosure may include a variable cover 171, a top cover 172, and a base plate 173, but is not limited thereto.

The cover unit 170 is disposed in the second support area PA2 of the back cover 110 to accommodate the printed circuit board 140. The printed circuit board 140, a part of a lower portion of the back cover 110 corresponding to the printed circuit board 140, and a part of an upper portion of the extending sheet 115 may be inserted into the cover unit 170. The cover unit 170 accommodates the printed circuit board 140 to protect the printed circuit board 140.

The base plate 173 may be disposed on bottom surfaces of the back cover 110 and the extending sheet 115. The base plate 173 may be fastened with the extending sheet 115 on the bottom surfaces of the back cover 110 and the extending sheet 115 on which the display panel 120 is not disposed. The base plate 173 and the printed circuit board 140 may be disposed so as to correspond to each other with the back cover 110 therebetween. Therefore, the base plate 173 may support the printed circuit board 140 together with the second support area PA2 of the back cover 110. For example, the base plate 173 is formed of a material having a rigidity to support the second support area PA2 to be flat, but is not limited thereto.

The top cover 172 may be disposed on the top surface of the back cover 110.

The top cover 172 may be disposed to accommodate the printed circuit board 140 disposed above the second support area PA2 of the back cover 110. The top cover 172 of the cover unit 170 is disposed in the second support area PA2 of the back cover 110 to accommodate the printed circuit board 140. The printed circuit board 140 and parts of the back cover 110 and the extending sheet 115 corresponding to the printed circuit board 140 may be inserted into the cover unit 170. The cover unit 170 is disposed to cover the printed circuit board 140 to protect the printed circuit board 140.

The top cover 172 may be configured by a first top cover 172a which accommodate the printed circuit board 140 and a second top cover 172b which is disposed on a side surface and a top surface of the first top cover 172a to be coupled to the variable cover 171, but is not limited thereto.

The first top cover 172a may have a groove in which the printed circuit board 140 is accommodated so as not to move. Therefore, the movement of the printed circuit board 140 accommodated in the top cover 172 is minimized and the printed circuit board 140 may be stably rolled.

A part of the second top cover 172b which is disposed on a side surface of the first top cover 172a may be fastened with the extending sheet 115 and the base plate 173. A guide unit 175 may be disposed on a top surface of a portion of the second top cover 172b which is disposed on a top surface of the first top cover 172a.

The guide unit 175 is coupled to the variable cover 171 to guide the variable cover 171 to move up and down.

The guide unit 175 may be configured to include a vertical portion 175a vertically protruding toward the variable cover 171 and a horizontal portion 175b which horizontally extends from both sides of the vertical portion 175a. The horizontal portion 175b guides the variable cover 171 to move up or down by means of a moving passage 174 of the variable cover 171.

The variable cover 171 may be disposed on the top surface of the back cover 110.

The variable cover 171 may be disposed to cover the printed circuit board 140 disposed on the second support area PA2 of the back cover 110 and may have a convex top surface. That is, the top surface of the variable cover 171 may be formed as a curved surface. The variable cover 171 is disposed on a top surface of the back cover 110 on which the display panel 120 and the printed circuit board 140 are disposed and may move up or down by means of the guide unit 175. The variable cover 171 is formed of a material having a rigidity to protect the printed circuit board 140, but is not limited thereto.

In the meantime, the cover unit 170 excluding the variable cover 171 and the back cover 110 may be fixed to each other. For example, the cover unit 170 and the back cover 110 may be fixed to each other by a fastening member such as a screw which passes through the base plate 173, the top cover 172, and the back cover 110. The fastening member such as a screw may be disposed so as not to interfere with the printed circuit board 140 to dispose the printed circuit board 140 in the inside of the cover unit 170. However, the present disclosure is not limited thereto and the cover unit 170 and the back cover 110 may be fixed to each other by various methods. Further, for example, the cover unit 170 and the extending sheet 115 may be fixed to each other by a fastening member such as a screw which passes through the base plate 173, the top cover 172, and the extending sheet 115. However, the present disclosure is not limited thereto and the cover unit 170 and the extending sheet 115 may be fastened with each other by various methods. Further, for example, the back cover 110 and the extending sheet 115 overlap each other to be fixed to each other by a fastening member, such as a screw which passes through the back cover 110 and the extending sheet 115. Further, the back cover 110 and the extending sheet 115 overlap each other to be fixed to each other by a fastening member, such as a screw which passes through the base plate 173, the top cover 172, the back cover 110, and the extending sheet 115.

Figure 9:
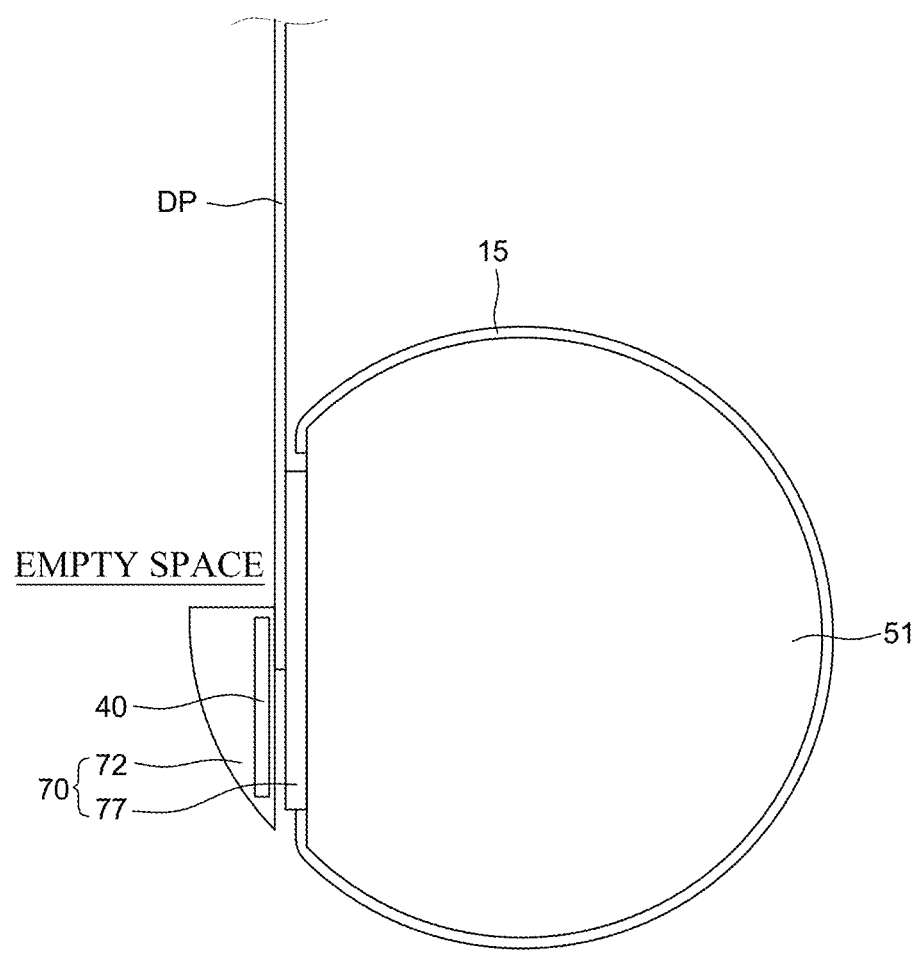
FIG. 9 is a partial cross-sectional view of a display device of a comparative embodiment.

FIG. 9 is a partial cross-sectional view of a display device of a comparative embodiment.

A cover unit 70 of FIG. 9 includes a top cover 72 and a bottom cover 77.

Referring to FIG. 9, a rollable display device in which polyimide is used as a substrate uses a D-cut shape roller 51 having a flat portion and an empty space is generated in a part of the cover unit 70 to ensure the display area. In this case, the rolling is abnormally performed due to the empty space so that a flat area is generated in the display unit DP. The empty space is caused due to a portion corresponding to the flat portion of the roller 51 which is not filled and does not completely form a radius of curvature of the roller 51. A flat area is necessary for a routing unit to suppress the crack of the routing unit, which may cause the stain of the display panel or separation of films and organic layers during the long-time rolling. For reference, reference numeral 15 which has not been described refers to an extending sheet.

Therefore, the present disclosure includes the variable cover 171 and the roller shell 180 to implement a uniform radius of curvature for the entire section of the roller 151 to reduce the stain, the cracks, and separation of the display panel 120 caused during the rolling.

Figure 10A:
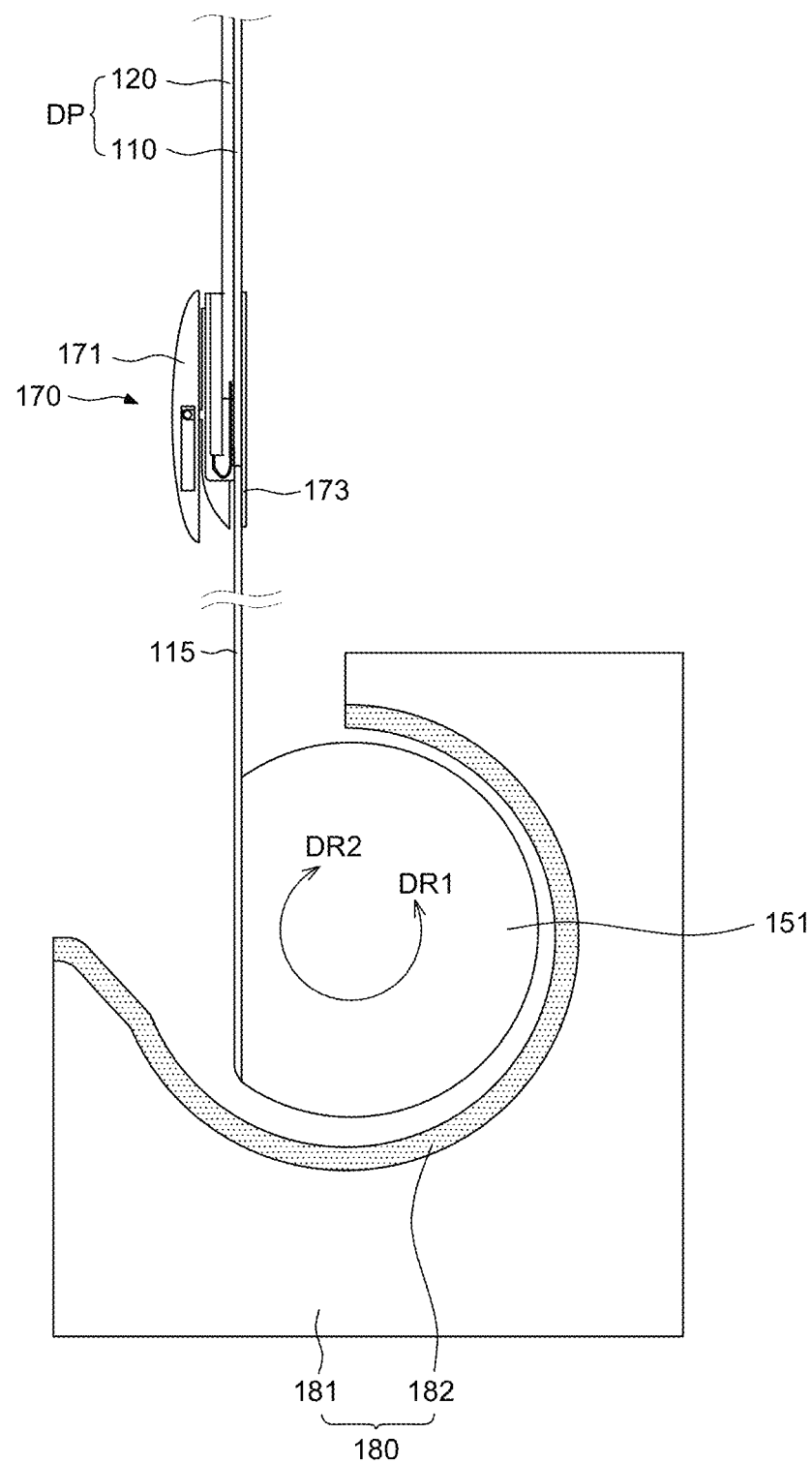
FIGS. 10A to 10C are cross-sectional views illustrating a rolling process in a display device according to an exemplary embodiment of the present disclosure, as an example.
Figure 10B:
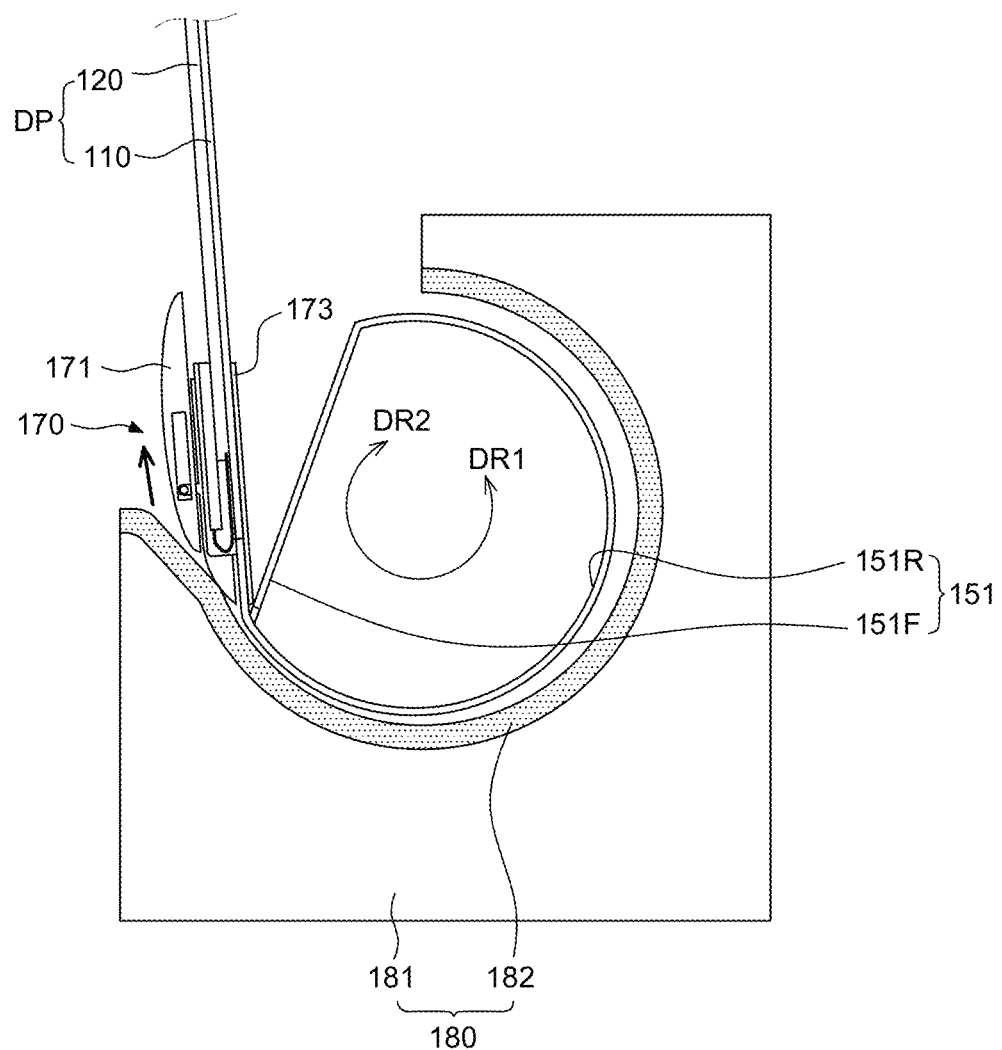
Figure 10C:
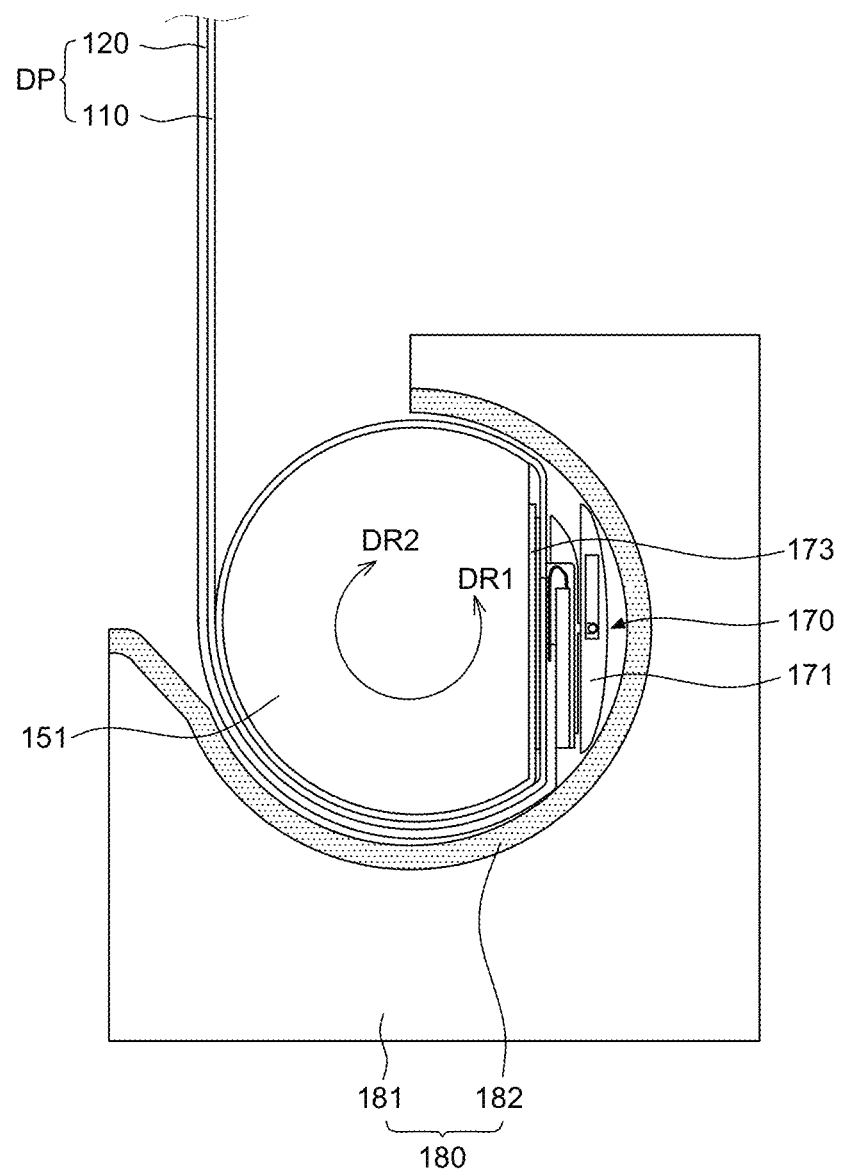

FIGS. 10A to 10C are cross-sectional views illustrating a rolling process in a display device according to an exemplary embodiment of the present disclosure, as an example.

Referring to FIG. 10A, according to the exemplary embodiment of the present disclosure, the display unit DP is rolled in a state in which the roller 151 is accommodated in the roller shell 180.

That is, in a state in which an upper side of the extending sheet 115 is connected to the display unit DP by means of the cover unit 170 and a lower side of the extending sheet 115 is fastened with the roller 151, the roller 151 may be accommodated in the roller shell 180.

The roller shell 180 may mainly include a case 181 which accommodates the roller 151 and a buffer unit 182 provided on an inner surface of the case 181, but is not limited thereto.

At this time, when the roller 151 rotates in the first direction DR1, that is, in a counterclockwise direction, the display panel 120 is wound and the variable cover 171 moves up by the roller shell 180. That is, referring to FIG. 10B, when the display panel 120 is wound, the variable cover 171 moves up by the roller shell 180 to fill the empty space of the cover unit 170. Therefore, the normal rolling is possible over the entire section of the roller 151 and the stain and separation issues may be improved. To be more specific, when the roller 151 and the display unit DP are wound, the variable cover 171 is in contact with an inlet of the buffer unit 182 of the roller shell 180 and thus the variable cover 171 is pushed to be relatively moved up. Therefore, the empty space of the cover unit 170 is filled to form a substantially circular shape together with the curved portion 151R of the roller 151.

That is, for example, the variable cover 171 which moves up may form a substantial D shape together with the base plate 173. The cover unit 170 having a substantial D shape is seated on a flat portion 151F of the roller 151 to form a substantially circular shape together with the curved portion 151R of the roller 151.

Accordingly, the abnormal rolling due to the empty space may be avoided and thus, the stain, crack, and separation issues of the display panel 120 may be eliminated.

The buffer unit 182 of the roller shell 180 which is in contact with the variable cover 171 is configured of a soft synthetic resin such as urethane to suppress the problems such as scratches due to the pushing.

Next, referring to FIG. 10C, the display unit DP may be wound or unwound according to the rolling of the roller 151.

In contrast, when the display panel 120 is unwound, the variable cover 171 moves down to ensure the display area AA (see FIG. 10A).

When the roller 151 rotates in the second direction DR2, that is, in a clockwise direction, the display panel 120 is unwound, the variable cover 171 naturally moves down due to the gravity, and the display area AA of the display panel 120 may be exposed.

The above-described exemplary embodiment of the present disclosure is a top folding structure in which the printed circuit board 140 is disposed on a top surface of the display panel 120, but is not limited thereto. The present disclosure is also applicable to a bottom folding structure in which the printed circuit board is disposed on a bottom surface of the display panel, which will be described in detail with reference to FIGS. 11, 12A, 12B, 13A, and 13B.

<Configuration of Cover Unit in Bottom Folding Structure>

Figure 11:
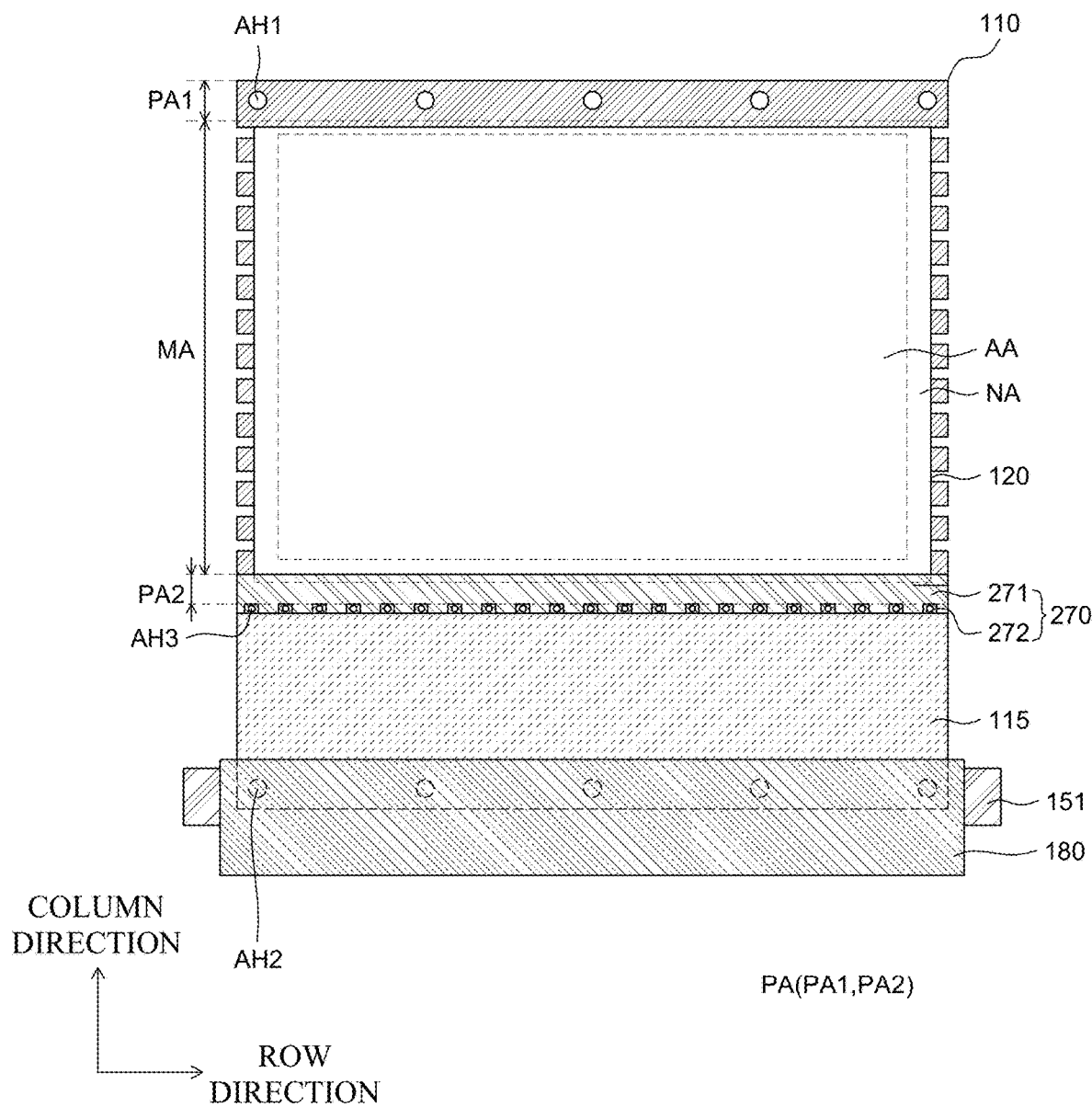
FIG. 11 is a plan view of a display device according to another exemplary embodiment of the present disclosure.

FIG. 11 is a plan view of a display device according to another exemplary embodiment of the present disclosure.

Figure 12A:
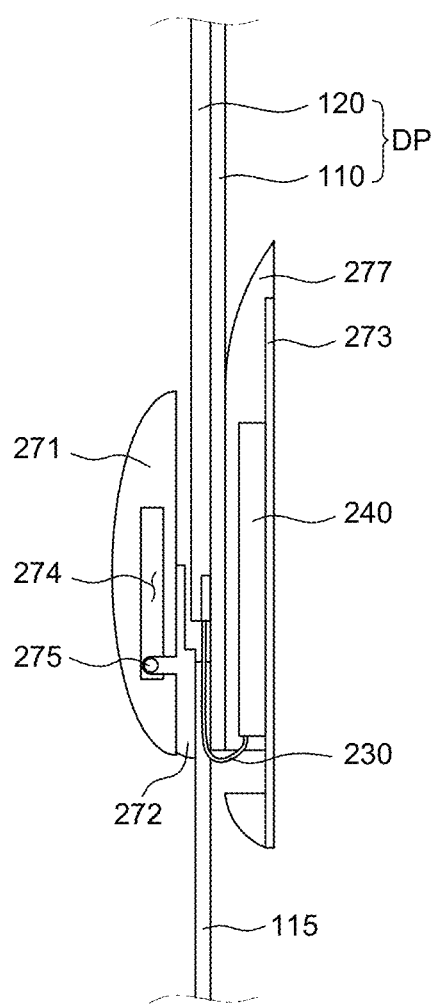
FIG. 12A is a cross-sectional view of a cover unit according to another exemplary embodiment of the present disclosure.

FIG. 12A is a cross-sectional view of a cover unit according to another exemplary embodiment of the present disclosure.

Figure 12B:
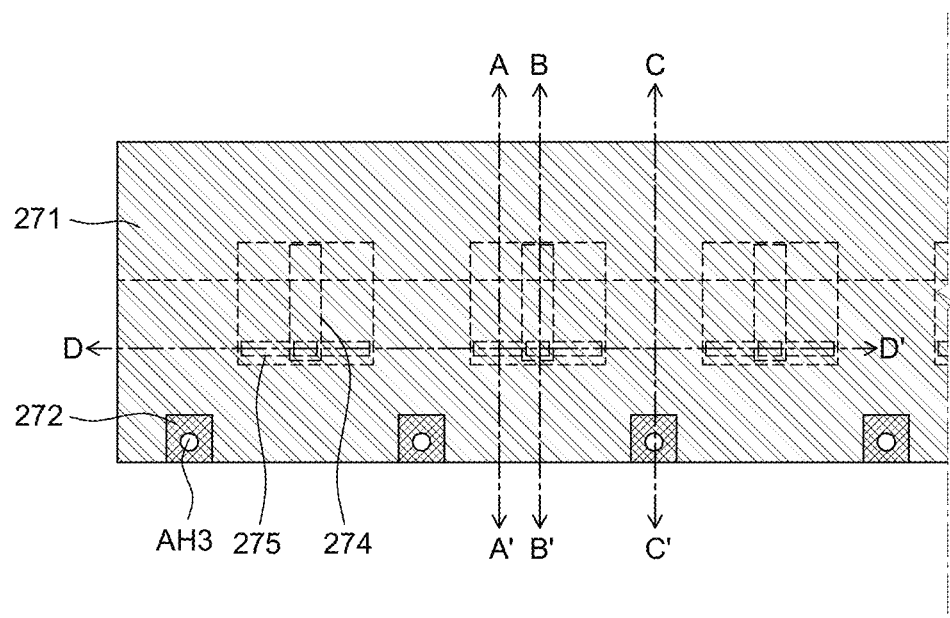
FIG. 12B is a partial plan view of a cover unit according to another exemplary embodiment of the present disclosure.

FIG. 12B is a partial plan view of a cover unit according to another exemplary embodiment of the present disclosure.

Figure 13A:
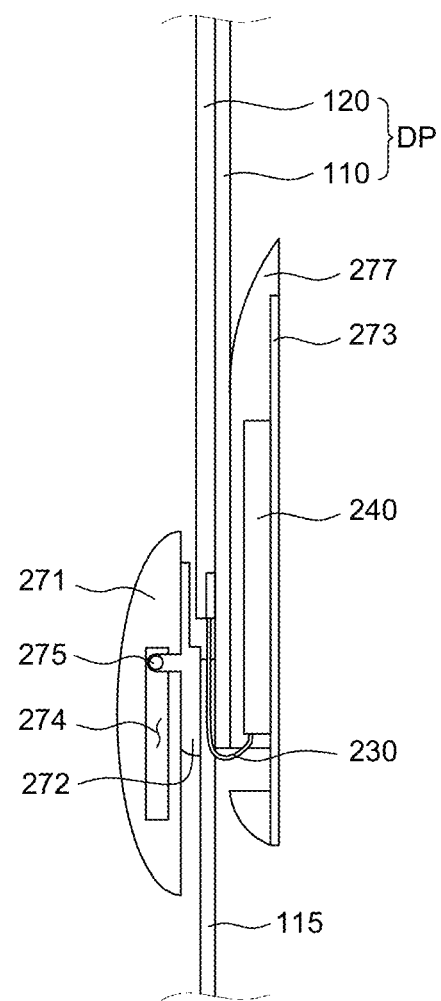
FIG. 13A is a cross-sectional view of a cover unit according to another exemplary embodiment of the present disclosure.

FIG. 13A is a cross-sectional view of a cover unit according to another exemplary embodiment of the present disclosure.

Figure 13B:
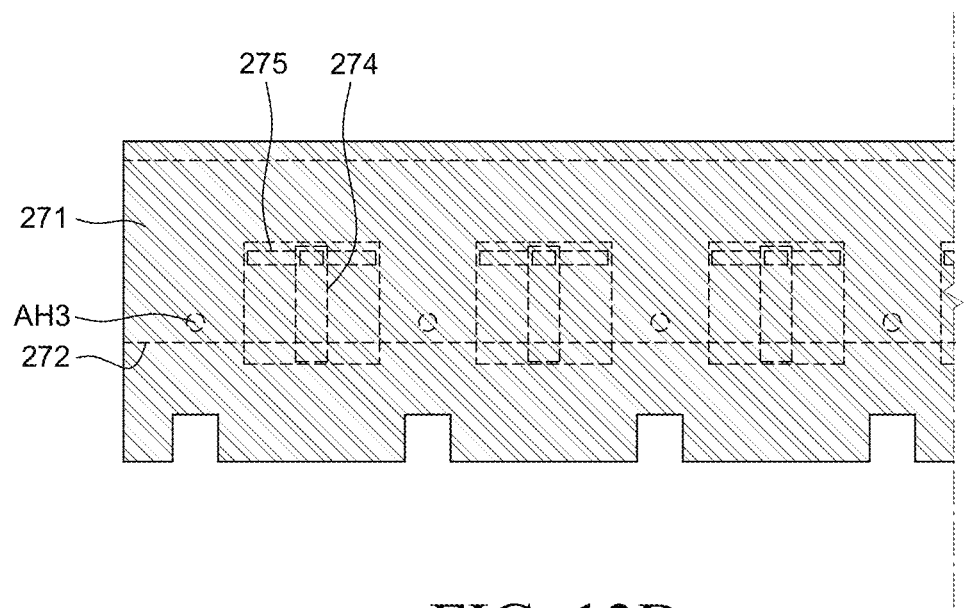
FIG. 13B is a partial plan view of a cover unit according to another exemplary embodiment of the present disclosure.

FIG. 13B is a partial plan view of a cover unit according to another exemplary embodiment of the present disclosure.

As compared with the display device 100 of FIGS. 5 to 8A and 8B, only configurations of a cover unit 270, a flexible film 230, and a printed circuit board 240 of a display device 200 of FIGS. 11, 12A, 12B, 13A, and 13B are different, but the other configurations are substantially the same so that a redundant description will be omitted. The same configuration will be denoted with the same reference numeral.

In FIG. 11, a lifting unit is not illustrated for the convenience of the description.

FIGS. 12A and 13A illustrate cross-sections of a cover unit 270 and parts of a display unit DP and an extending sheet 115.

FIGS. 12B and 13B are plan views of a cover unit 270 as seen from a top surface.

FIGS. 12A and 12B are a cross-sectional view and a plan view illustrating a state that a variable cover 271 is in contact with a roller shell 180 to move up during the winding of the display unit DP.

In contrast, FIGS. 13A and 13B are a cross-sectional view and a plan view illustrating a state that the variable cover 271 moves down by the gravity during the unwinding of the display unit DP.

Referring to FIGS. 11, 12A, 12B, and 13A, the display unit DP according to another exemplary embodiment of the present disclosure may include a back cover 110, a display panel 120, a flexible film 230, and a printed circuit board 240.

At this time, the cover unit 270 may be disposed so as to cover the flexible film 230 and the printed circuit board 240.

The flexible film 230 is disposed at one end of the non-display area NA of the display panel 120 and the printed circuit board 240 is disposed on a bottom surface of the display panel 120 (bottom folding) to be connected to the flexible film 230.

The back cover 110 is disposed on a bottom surface of the display panel 120 and a top surface of the printed circuit board 240 to support the display panel 120, the flexible film 230, and the printed circuit board 240. When the display unit DP is in a vertical state, the cover unit 270 is disposed at a lowermost edge of the display unit DP and an upper edge of the extending sheet 115 may be fastened with the cover unit 270. A third fastening hole AH3 may be formed in the top cover 272 and an upper edge of the extending sheet 115 and the top cover 272 and the extending sheet 115 may be fastened by means of the third fastening hole AH3.

The extending sheet 115 extends downwardly so that the lowermost edge thereof may be fastened with the roller 151. A second fastening hole AH2 may be formed at a lower edge of the extending sheet 115 and the roller 151 and the extending sheet 115 may be fastened by means of the second fastening hole AH2.

A roller shell 180 is disposed at the outside of the roller 151 so that the extending sheet 115 and the display unit DP are wound by the roller shell 180 to be in close contact with an outer circumferential surface of the roller 151.

The cover unit 270 according to another exemplary embodiment of the present disclosure may include a variable cover 271, a top cover 272, a bottom cover 277, and a base plate 273, but is not limited thereto.

The cover unit 270 is disposed in the second support area PA2 of the back cover 110 to accommodate the printed circuit board 240. The printed circuit board 240 and a part of a lower portion of the back cover 110 and a part of an upper portion of the extending sheet 115 corresponding to the printed circuit board 240 may be inserted into the cover unit 270. The cover unit 270 accommodates the printed circuit board 240 to protect the printed circuit board 240.

The base plate 273 may be disposed on a bottom surface of the back cover 110 and the extending sheet 115. The base plate 273 may be fastened with the extending sheet 115 on the bottom surfaces of the back cover 110 and the extending sheet 115 on which the display panel 120 is not disposed. The base plate 273 and the printed circuit board 240 may be disposed on the bottom surface of the back cover 110.

The bottom cover 277 may be disposed on the bottom surface of the back cover 110. The bottom cover 277 may be disposed between the back cover 110 and the base plate 273.

The bottom cover 277 may be disposed to accommodate the printed circuit board 240 disposed in the second support area PA2 of the back cover 110. The bottom cover 277 is disposed on a top surface of the base plate 273 to accommodate the printed circuit board 240 therein.

That is, the bottom cover 277 may have a groove in which the printed circuit board 240 is accommodated so as not to move. Therefore, the movement of the printed circuit board 240 accommodated in the bottom cover 277 is minimized and the printed circuit board 140 may be stably rolled.

The top cover 272 may be disposed on the top surface of the back cover 110.

The guide unit 275 may be disposed on the top surface of the top cover 272.

The guide unit 275 is coupled to the variable cover 271 to guide the variable cover 271 to move up and down.

The guide unit 275 guides the variable cover 271 to move up and down by means of a moving passage 274 of the variable cover 271.

The variable cover 271 may be disposed on the top surface of the back cover 110.

The variable cover 271 may have a convex top surface. That is, the top surface of the variable cover 271 may be formed as a curved surface. The variable cover 271 is disposed on a top surface of the back cover 110 on which the display panel 120 is disposed and may move up and down by means of the guide unit 275.

In the meantime, the cover unit 270 excluding the variable cover 271, the back cover 110, and the extending sheet 115 may be fastened with each other to be fixed. For example, the cover unit 270 and the back cover 110 and the extending sheet 115 may be fixed to each other by a fastening member such as a screw which passes through the base plate 273, the bottom cover 277, the top cover 272, the extending sheet 115, and the back cover 110. However, the present disclosure is not limited thereto and the cover unit 270 and the back cover 110 may be fixed to each other by various methods.

According to another exemplary embodiment of the present disclosure, differently from the exemplary embodiment of the present disclosure as described above, the extending sheet 115 may be disposed on the top surface of the back cover 110, similarly to the display panel 120, but is not limited thereto.

When the display panel 120 is wound, the variable cover 271 moves up by the roller shell 180 to fill the empty space of the cover unit 270 so that the normal rolling in the entire section of the roller 151 is allowed and thus, the stain, and separation issues may be improved (see FIGS. 12A and 12B).

In contrast, when the display panel 120 is unwound, the variable cover 271 moves down to ensure the display area AA (see FIGS. 13A and 13B). That is, when the roller 151 rolls in a reverse direction, the variable cover 271 naturally moves down due to the gravity and the display area AA of the display panel 120 may be ensured.

Hereinafter, the cover unit 270 will be described in more detail with reference to FIGS. 14A, 14B, 15A, 15B, 15C, and 16.

<Specific Configuration of Cover Unit>

Figure 14A:
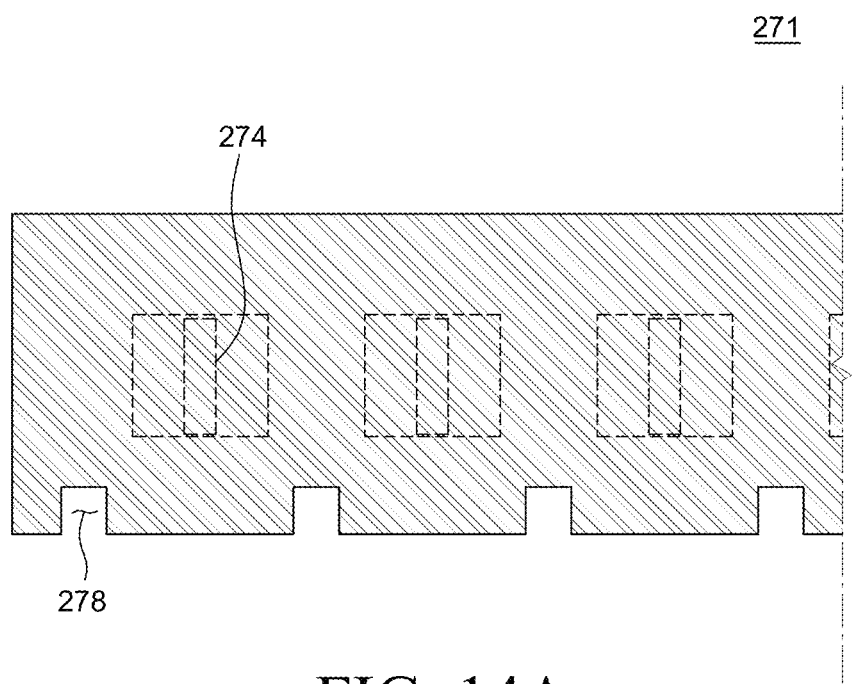
FIG. 14A is a partial plan view of a variable cover of FIG. 12B.

FIG. 14A is a partial plan view of a variable cover of FIG. 12B.

Figure 14B:
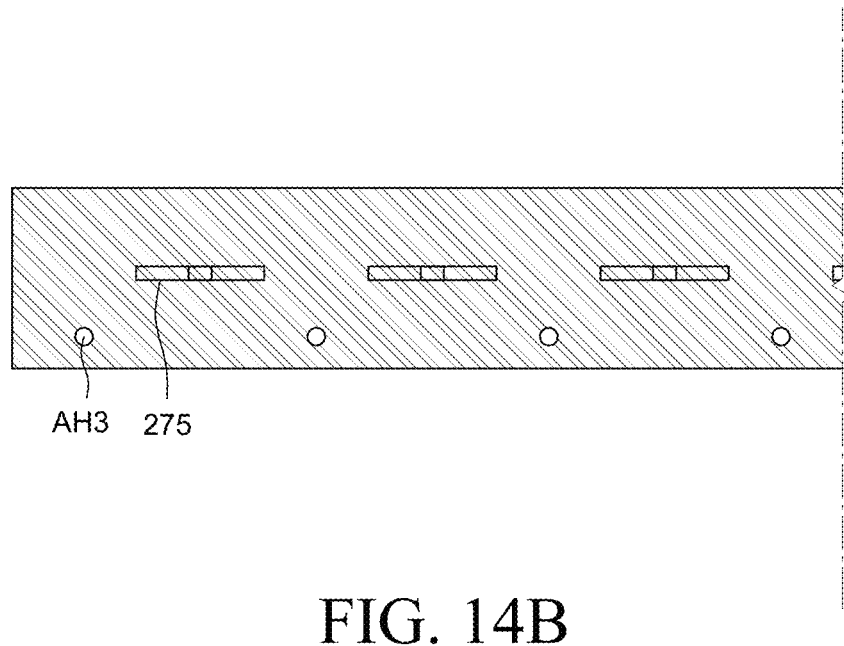
FIG. 14B is a partial plan view of a top cover of FIG. 12B.

FIG. 14B is a partial plan view of a top cover of FIG. 12B.

Figure 15A:
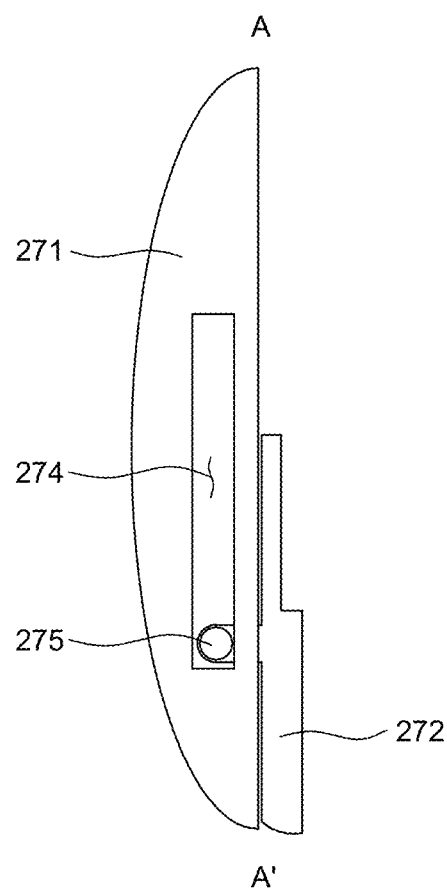
FIG. 15A is a cross-sectional view taken along the line A-A' of FIG. 12B.

FIG. 15A is a cross-sectional view taken along the line A-A' of FIG. 12B.

Figure 15B:
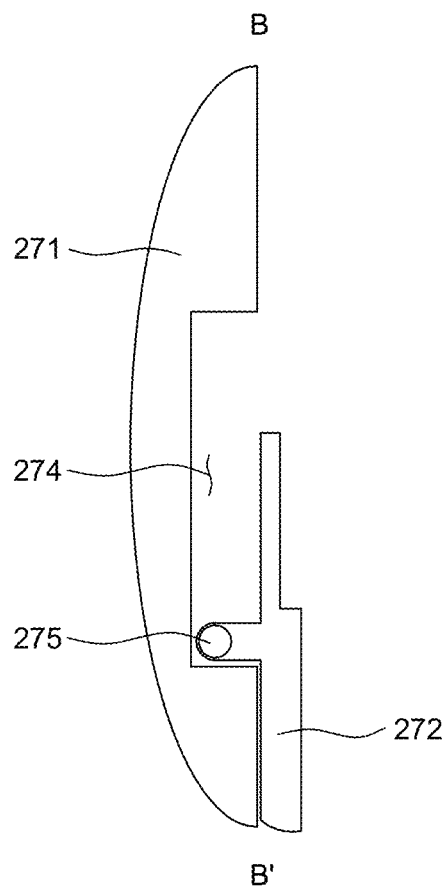
FIG. 15B is a cross-sectional view taken along the line B-B' of FIG. 12B.

FIG. 15B is a cross-sectional view taken along the line B-B' of FIG. 12B.

Figure 15C:
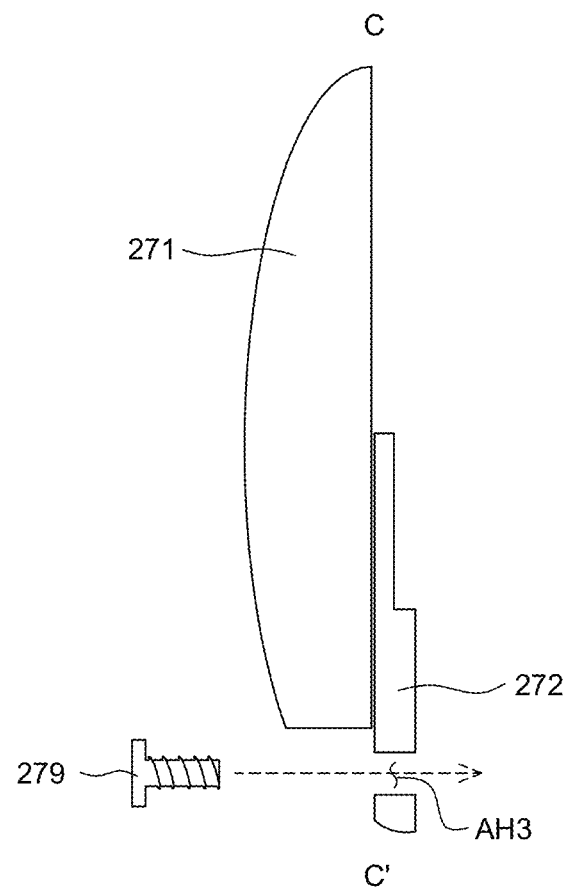
FIG. 15C is a cross-sectional view taken along the line C-C' of FIG. 12B.

FIG. 15C is a cross-sectional view taken along the line C-C' of FIG. 12B.

Figure 16:
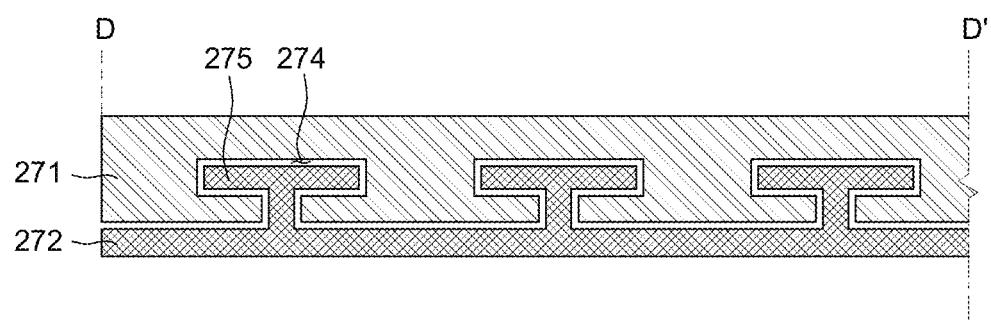
FIG. 16 is a cross-sectional view taken along the line D-D' of FIG. 12B.

FIG. 16 is a cross-sectional view taken along the line D-D' of FIG. 12B.

FIGS. 15A, 15B, and 15C are cross-sectional views of a variable cover 271 and a top cover 272 according to another exemplary embodiment of the present disclosure taken along the lines A-A', B-B', and C-C'.

Referring to FIGS. 14A, 14B, 15A, 15B, 15C, and 16, the cover unit 270 according to another exemplary embodiment of the present disclosure may include a variable cover 271, a top cover 272, a bottom cover 277, and a base plate 273, but is not limited thereto.

The top cover 272 may be disposed on a top surface of the back cover 110.

The top cover 272 may have a substantially rectangular planar shape, but is not limited thereto.

The guide unit 275 may be disposed on the top surface of the top cover 272.

The guide unit 275 is a configuration which guides the variable cover 271 to move up or down so that a plurality of guide units may be provided on the top surface of the top cover 272 with a predetermined interval.

The guide unit 275 guides the variable cover 271 to move up or down by means of a moving passage 274 of the variable cover 271.

A plurality of third fastening holes AH3 may be disposed on a lower side of the top cover 272 to be fastened with the extending sheet 115 and a fastening member 279, such as a screw, passes through the third fastening holes AH3 to fasten the top cover 272 and the extending sheet 115, but is not limited thereto.

The variable cover 271 is disposed on the top surface of the top cover 272 to move up or down by means of the guide unit 275 of the top cover 272.

The variable cover 271 may have a convex top surface. That is, the top surface of the variable cover 271 may be formed as a curved surface.

The variable cover 271 may have a substantially rectangular planar shape, but is not limited thereto.

The variable cover 271 may include a cut portion 278 obtained by removing a predetermined area for performing a fastening task of the fastening member 279, in the third fastening hole AH3 at a lower side thereto, but is not limited thereto.

The variable cover 271 may include a predetermined moving passage 274 therein to allow the guide unit 275 to move.

The moving passage 274 includes a groove having a length corresponding to the vertical movement of the variable cover 271 and the bottom surface of the variable cover 271 may be removed to allow the vertical portion of the guide unit 275 to pass and move (see FIG. 15B).

Hereinafter, the roller shell 280 will be described in more detail with reference to FIGS. 17, 18A, 18B, and 18C.
<Specific Configuration of Roller Shell>

Figure 17:
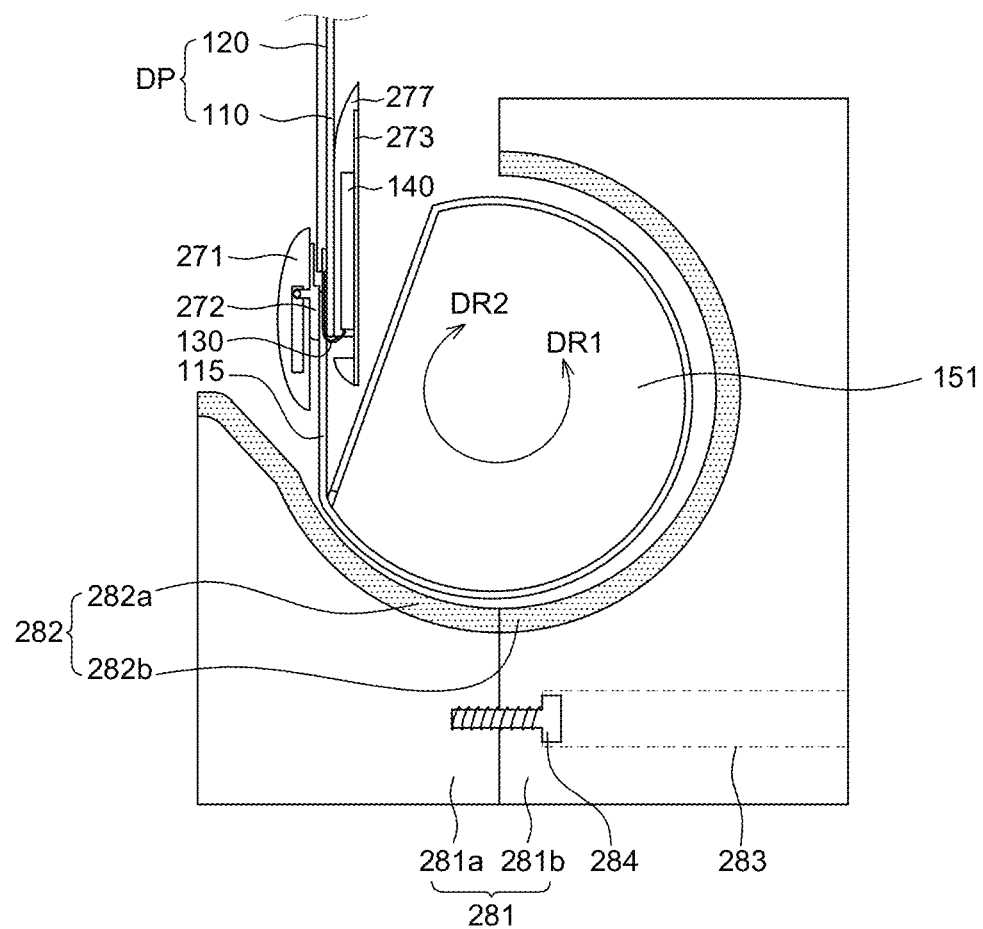
FIG. 17 is a cross-sectional view of a display device according to another exemplary embodiment of the present disclosure.

FIG. 17 is a cross-sectional view of a display device according to another exemplary embodiment of the present disclosure.

Figure 18A:
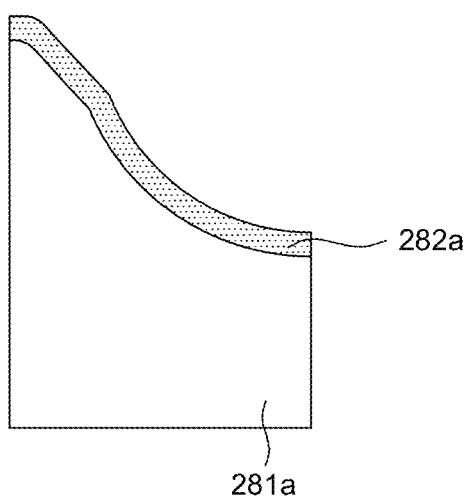
FIG. 18A is a cross-sectional view of a front roller shell of FIG. 17.

FIG. 18A is a cross-sectional view of a front roller shell of FIG. 17.

Figure 18B:
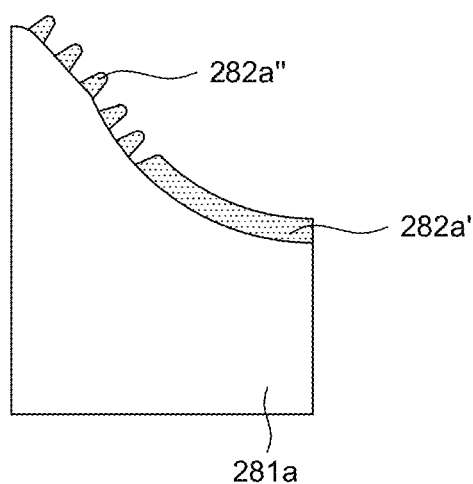
FIG. 18B is a cross-sectional view illustrating another example of a front roller shell.

FIG. 18B is a cross-sectional view illustrating another example of a front roller shell.

Figure 18C:
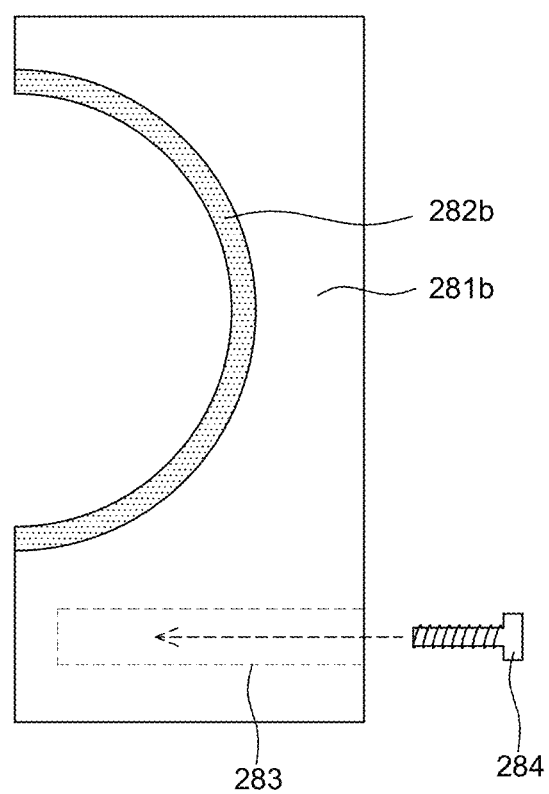
FIG. 18C is a cross-sectional view of a back roller shell of FIG. 17.

FIG. 18C is a cross-sectional view of a back roller shell of FIG. 17.

Referring to FIGS. 17, 18A, 18B, and 18C, the roller shell 280 may be disposed at the outside of the roller 151. The extending sheet 115 and the display unit DP may be wound to be in close contact with an outer circumferential surface of the roller 151 by the roller shell 280.

That is, for example, when the roller 151 rotates in the first direction DR1, that is, a counterclockwise direction, the display unit DP may be wound around the roller 151 so that a bottom surface of the display unit DP is in close contact with a surface of the roller 151.

In contrast, when the roller 151 rotates in the second direction DR2, that is, a clockwise direction, the display unit DP wound around the roller 151 is unwound from the roller 151 to be exposed to the outside of the housing unit HP.

The roller shell 280 may mainly include a case 281 which accommodates the roller 151 and a buffer unit 282 provided on an inner surface of the case 281, but is not limited thereto.

The case 281 may have a substantially long rectangular parallelepiped shape, but is not limited thereto.

A part of the top surface and a part of the side surface of the case 281 are removed to provide a space in which the display unit DP is wound or unwound together with the cover unit 270.

The case 281 may be divided into two configurations, that is, a front case 281a and a rear case 281b, to accommodate the roller 151, but is not limited thereto.

The front case 281a and the rear case 281b may be fastened with each other by a screw 284. That is, for example, a through hole 283 which passes through a bottom surface is provided in the rear case 281b and the screw 284 passes through the through hole 283 to be fastened with the front case 281a so that the front case 281a and the rear case 281b are fastened with each other. However, the present disclosure is not limited thereto so that the front case 281a and the rear case 281b are fastened with each other by another method.

The buffer unit 282 may also be divided into a front buffer unit 282a and a rear buffer unit 282b, but is not limited thereto.

The front buffer unit 282a may be provided on an inner surface of the front case 281a and the rear buffer unit 282b may be provided on an inner surface of the rear case 281b.

The case 281 may be configured by a soft synthetic resin, such as polyethylene terephthalate (PET), polypropylene (PP), and polycarbonate (PC). In contrast, the buffer unit 282 which is in contact with the variable cover 171 is configured by a soft synthetic resin such as silicone or urethane to suppress the problems such as scratches due to the pushing of the variable cover 171.

An initial contact portion 282a" (with the variable cover 171) of the front buffer unit 282a may be configured to be divided into a plurality of portions, as illustrated in FIG. 18B, to absorb the impact, but is not limited thereto.

The exemplary embodiments of the present disclosure can also be described as follows:

According to an aspect of the present disclosure, there is provided a display device. The display device includes a display panel in which a plurality of pixels is defined, a back cover disposed on a bottom surface of the display panel, a roller which winds or unwinds the back cover and the display panel and a cover unit which is disposed at a lower side of the display panel when the display panel is in a vertical state and includes a variable cover which moves up or down as the display panel is wound or unwound.

The display device may further include a flexible film disposed at the lower side of the display panel and a printed circuit board connected to the flexible film.

The cover unit may be disposed to cover the flexible film and the printed circuit board.

The display device may further include an extending sheet having one end fastened with the cover unit and the other end fastened with the roller.

The cover unit may include a top cover disposed on a top surface of the back cover, the variable cover which is disposed on a top surface of the top cover to move up or down and a base plate disposed on a bottom surface of the back cover.

The top cover may include a first top cover which accommodates the printed circuit board and a second top cover which is disposed on a top surface of the first top cover to be coupled to the variable cover.

The top cover may have a guide unit disposed on the top surface to be movably coupled to the variable cover to guide the variable cover to move up or down.

The cover unit may further include a bottom cover disposed between the back cover and the base plate.

The guide unit may include a vertical portion which vertically protrudes toward the variable cover and a horizontal portion which horizontally extends from both sides of the vertical portion.

The horizontal portion may guide the variable cover to move up or down by means of a moving passage of the variable cover.

The moving passage may include a groove having a length corresponding to vertical movement of the variable cover and a part of the variable cover may be removed to allow the vertical portion of the guide unit to pass and move.

The roller may have a curved portion and a flat portion.

The display device may further include a roller shell which is disposed at an outside of the roller to accommodate the roller.

The variable cover may be in contact with the roller shell during winding of the display panel to move up to form a circular shape together with the curved portion of the roller and may move down during unwinding of the display panel to expose a display area of the display panel.

The roller shell may include a case which accommodates the roller; and a buffer unit which is provided on an inner surface of the case.

A part of a top surface and a part of a side surface of the case may be removed to provide a space in which the display panel is wound or unwound.

The case may be divided into a front case and a rear case and the buffer unit may be divided into a front buffer unit and a rear buffer unit.

An initial contact portion of the front buffer unit may be divided into a plurality of portions.

The case may be configured by a synthetic resin, such as polyethylene terephthalate (PET), polypropylene (PP), or polycarbonate (PC) and the buffer unit may be configured by a synthetic resin such as silicone or urethane.

It will be apparent to those skilled in the art that various modifications and variations can be made in the display device of the present disclosure without departing from the technical idea or scope of the disclosure. Thus, it is intended that the present disclosure cover the modifications and variations of this disclosure provided they come within the scope of the appended claims and their equivalents.

What is claimed is:

1. A display device, comprising:
   a display panel in which a plurality of pixels is defined;
   a back cover disposed on a bottom surface of the display panel;
   a roller which winds or unwinds the back cover and the display panel; and
   a cover unit which is disposed at a lower side of the display panel and includes a variable cover which moves up or down as the display panel is wound or unwound.

2. The display device according to claim 1, further comprising:
   a flexible film disposed at the lower side of the display panel; and
   a printed circuit board connected to the flexible film.

3. The display device according to claim 2, wherein the cover unit is disposed to cover the flexible film and the printed circuit board.

4. The display device according to claim 1, further comprising:
   an extending sheet having one end fastened with the cover unit and the other end fastened with the roller.

5. The display device according to claim 1, wherein the cover unit includes:
   a top cover disposed on a top surface of the back cover;
   the variable cover which is disposed on a top surface of the top cover to move up or down; and
   a base plate disposed on a bottom surface of the back cover.

6. The display device according to claim 5, wherein the top cover includes:
   a first top cover which accommodates the printed circuit board; and
   a second top cover which is disposed on a top surface of the first top cover to be coupled to the variable cover.

7. The display device according to claim 5, wherein the top cover has a guide unit disposed on the top surface to be movably coupled to the variable cover to guide the variable cover to move up or down.

8. The display device according to claim 5, wherein the cover unit further includes:
   a bottom cover disposed between the back cover and the base plate.

9. The display device according to claim 7, wherein the guide unit includes:
   a vertical portion which vertically protrudes toward the variable cover; and
   a horizontal portion which horizontally extends from both sides of the vertical portion.

10. The display device according to claim 9, wherein the horizontal portion guides the variable cover to move up or down by means of a moving passage of the variable cover.

11. The display device according to claim 10, wherein the moving passage includes a groove having a length corresponding to vertical movement of the variable cover and a part of the variable cover is removed to allow the vertical portion of the guide unit to pass and move.

12. The display device according to claim 1, wherein the roller has a curved portion and a flat portion.

13. The display device according to claim 12, further comprising:
   a roller shell which is disposed at an outside of the roller to accommodate the roller.

14. The display device according to claim 13, wherein the variable cover is in contact with the roller shell during winding of the display panel to move up to form a circular shape together with the curved portion of the roller and moves down during unwinding of the display panel to expose a display area of the display panel.

15. The display device according to claim 13, wherein the roller shell includes:
   a case which accommodates the roller; and
   a buffer unit which is provided on an inner surface of the case.

16. The display device according to claim 15, wherein a part of a top surface and a part of a side surface of the case are removed to provide a space in which the display panel is wound or unwound.

17. The display device according to claim 15, wherein the case is divided into a front case and a rear case and the buffer unit is divided into a front buffer unit and a rear buffer unit.

18. The display device according to claim 17, wherein an initial contact portion of the front buffer unit is divided into a plurality of portions.

19. The display device according to claim 15, wherein the case is configured by a synthetic resin, such as polyethylene terephthalate (PET), polypropylene (PP), or polycarbonate (PC) and the buffer unit is configured by a synthetic resin such as silicone or urethane.

* * * * *